United States Patent [19]
Asakawa et al.

[11] Patent Number: 5,892,598
[45] Date of Patent: Apr. 6, 1999

[54] HEAD UP DISPLAY UNIT, LIQUID CRYSTAL DISPLAY PANEL, AND METHOD OF FABRICATING THE LIQUID CRYSTAL DISPLAY PANEL

[75] Inventors: Shiro Asakawa, Nara; Hiroshi Tsutsui, Yawata; Yoshinao Taketomi, Tuzuki-gun; Eiichiro Okuda, Habikino, all of Japan

[73] Assignee: Matsushita Electric Industrial Co., Ltd., Osaka, Japan

[21] Appl. No.: 617,879

[22] PCT Filed: Apr. 3, 1995

[86] PCT No.: PCT/JP95/00671

§ 371 Date: May 29, 1996

§ 102(e) Date: May 29, 1996

[87] PCT Pub. No.: WO96/02862

PCT Pub. Date: Feb. 1, 1996

[30] Foreign Application Priority Data

| Jul. 18, 1994 | [JP] | Japan | 6-163759 |
| Jul. 19, 1994 | [JP] | Japan | 6-166706 |
| Jul. 22, 1994 | [JP] | Japan | 6-170964 |

[51] Int. Cl.⁶ ............................................. E03H 1/00
[52] U.S. Cl. .................... 359/13; 359/34; 349/11; 345/7
[58] Field of Search ............... 359/13, 14, 34; 345/7; 349/11, 86

[56] References Cited

U.S. PATENT DOCUMENTS

| 3,945,716 | 3/1976 | Kinder | 359/13 |
| 4,664,475 | 5/1987 | Ferrer | 359/15 |
| 4,740,780 | 4/1988 | Brown et al. | 345/7 |
| 4,942,101 | 7/1990 | Keys et al. | 430/1 |
| 4,950,567 | 8/1990 | Keys et al. | 430/1 |
| 4,959,283 | 9/1990 | Smothers et al. | 430/1 |
| 4,965,152 | 10/1990 | Keys et al. | 430/1 |
| 5,024,909 | 6/1991 | Smothers et al. | 430/1 |
| 5,099,343 | 3/1992 | Margerum et al. | 349/86 |
| 5,204,666 | 4/1993 | Aoki et al. | 359/13 |
| 5,418,631 | 5/1995 | Tedesco | 359/34 |
| 5,455,692 | 10/1995 | Wreede | 359/13 |
| 5,519,519 | 5/1996 | Nakajima et al. | 349/86 |

FOREIGN PATENT DOCUMENTS

| 0 399 506 | 11/1990 | European Pat. Off. . |
| 3120601 | 12/1982 | Germany . |
| 1-142713 | 6/1989 | Japan . |
| 1-225924 | 9/1989 | Japan . |
| 1-252689 | 10/1989 | Japan . |
| 2-3082 | 1/1990 | Japan . |
| 2-99919 | 4/1990 | Japan . |
| 3-23423 | 1/1991 | Japan . |
| 3-19803 | 8/1991 | Japan . |
| 4-101579 | 9/1992 | Japan . |
| 4-303822 | 10/1992 | Japan . |
| 2 260 203 | 4/1993 | United Kingdom . |
| WO 94/20871 | 9/1994 | WIPO . |

OTHER PUBLICATIONS

Hiroshi Kato et al., "Development of Hologram Head–Up Display," SAE Technical Paper Series 920600, (Feb. 1992), pp. 21–27.

Stephen A. Benton et al., "Edge–Lit Rainbow Holograms," SPIE vol. 1212 Practical Holography IV (1990), pp. 149–157.

Lawrence Domash et al., "Active Holographic Interconnects for Interfacing Volume Storage," SPIE vol. 1662 Image Stroage and Retrieval Systems (1992), pp. 211–217.

Primary Examiner—Cassandra Spyrou
Assistant Examiner—Darren E. Schuberg
Attorney, Agent, or Firm—Ratner & Prestia

[57] ABSTRACT

A head up display unit equipped at least with transparent and flat image information display means, transparent and flat light irradiating means arranged in an opposed and close contact relationship with the image information display means, light supply means for supplying light to the light irradiating means, image-display control means for controlling image display, and light-supply control means for controlling light supply. The display unit is a compact head up display unit which can be used in any place in the interior of an automobile.

14 Claims, 25 Drawing Sheets

Fig. 11
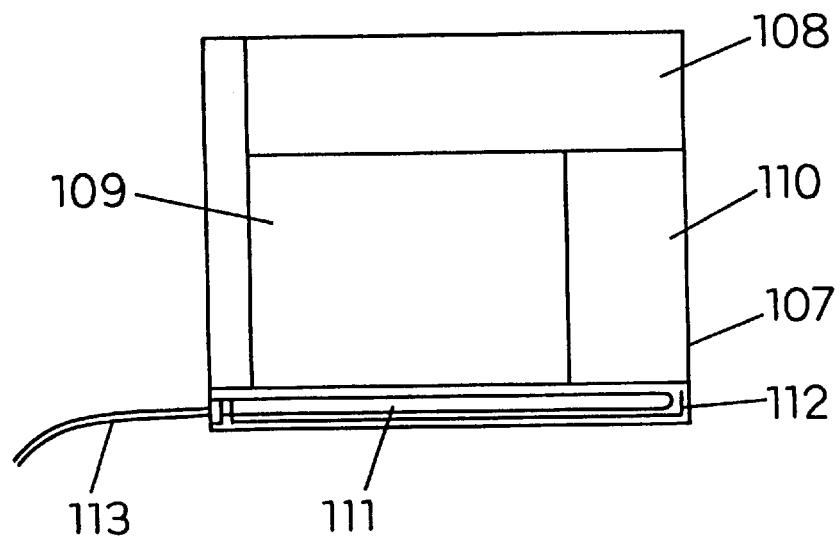
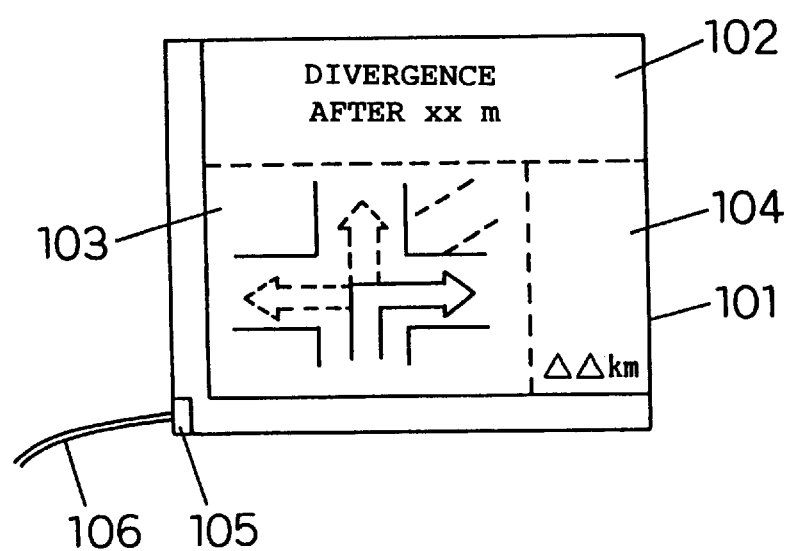

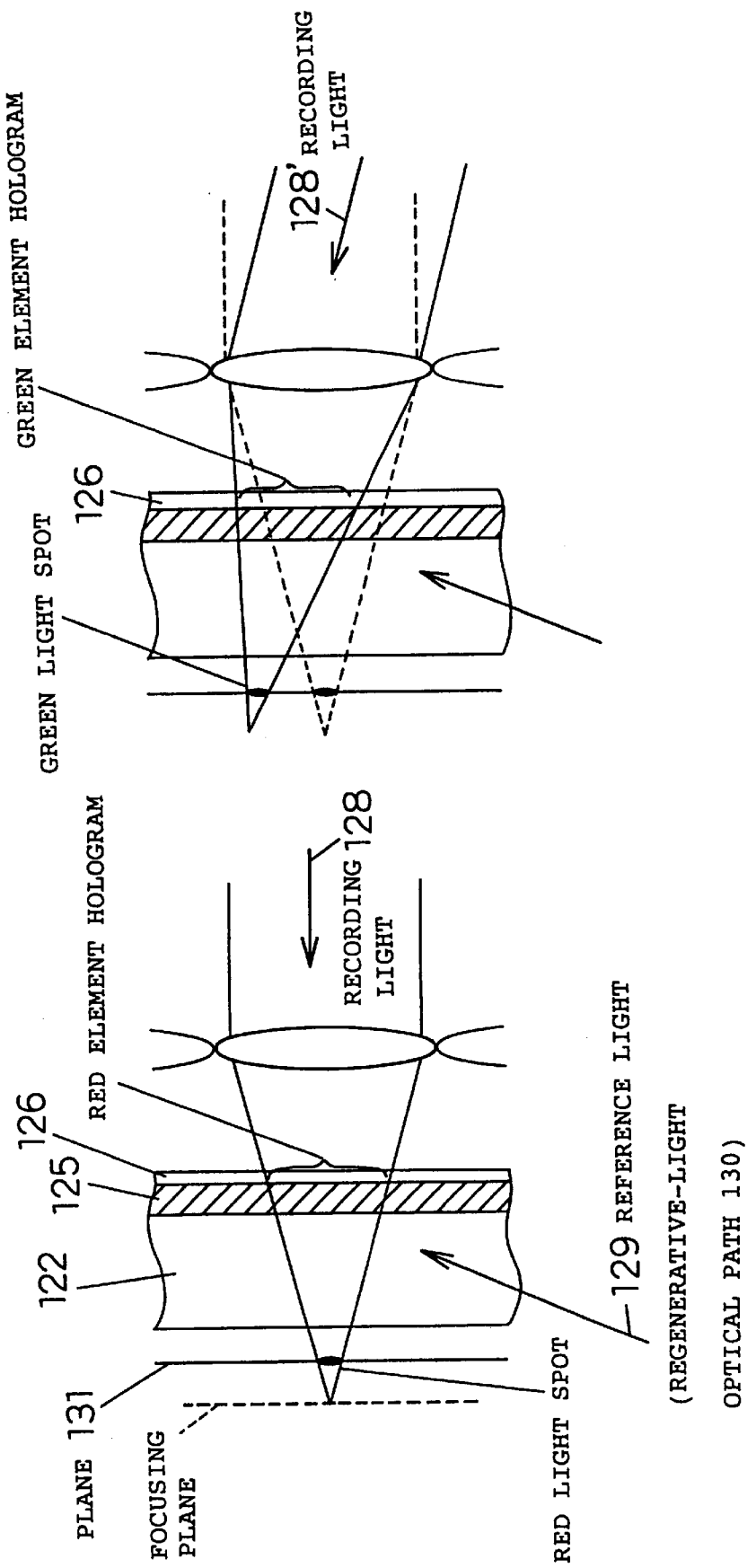

Fig. 18
IMAGE FORMING SURFACE
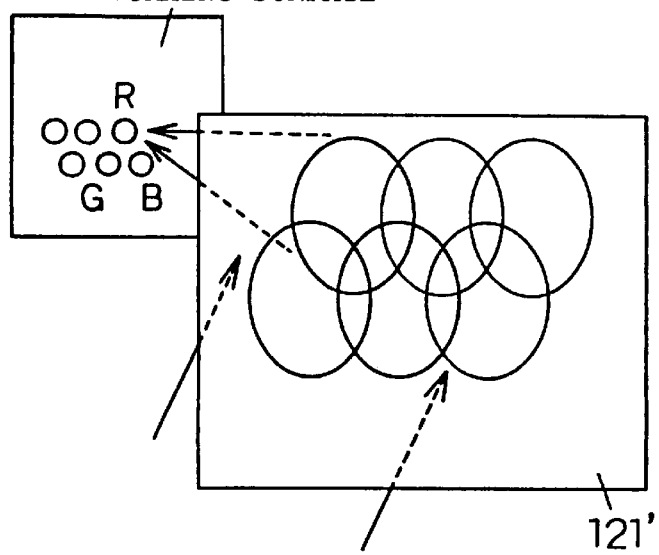
Fig. 19
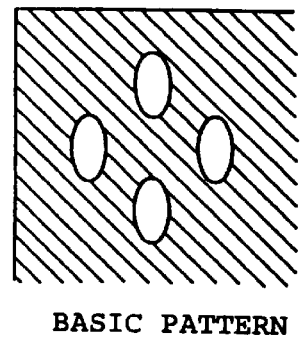
BASIC PATTERN
Fig. 20  Fig. 21
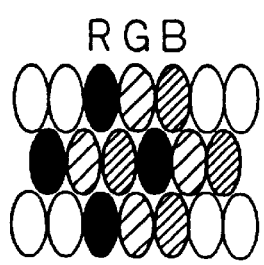
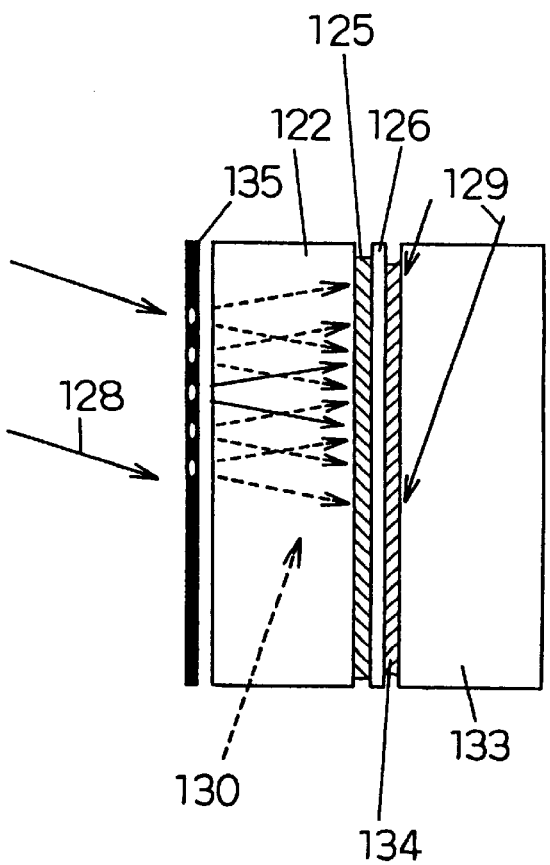
Fig. 22
Fig. 23
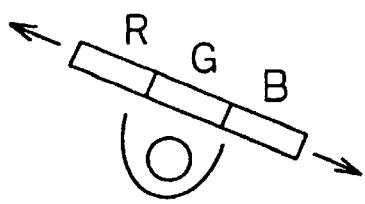

POLYMER DISPERSED
LIQUID CRYSTAL DEVICE

POLYMER DISPERSED
LIQUID CRYSTAL DEVICE

SQUARE HOLE PATTERN

VERY SMALL SCATTERING SURFACE ELEMENT

FORWARDLY SCATTERED LIGHT

NOISE GRATING

ILLUMINATION LIGHT

VIRTUAL FILM
$t_2$ THICKNESS
$t_1$
30°  45°
p INTERVAL
W

VERY SMALL SCATTERING AREA

Fig. 39(a)       Fig. 39(b)
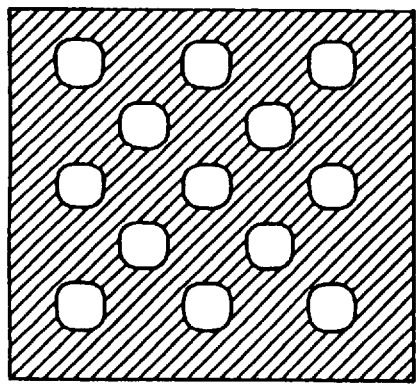 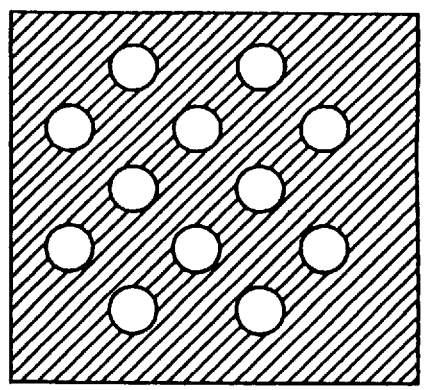
Fig. 39(c)
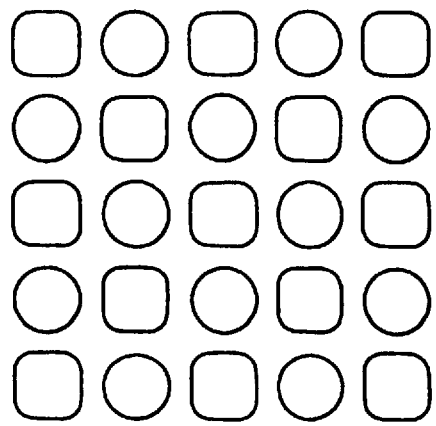
▢ P POLARIZED LIGHT
◯ S POLARIZED LIGHT

HEAD UP DISPLAY UNIT, LIQUID CRYSTAL DISPLAY PANEL, AND METHOD OF FABRICATING THE LIQUID CRYSTAL DISPLAY PANEL

TECHNICAL FIELD

The present invention relates to a head up display where, in a vehicle such as an automobile, a ship, and a railroad vehicle, forward external-scene information and various kinds of image and character information from the interior are superimposed and looked at by an operator (driver).

BACKGROUND ART

In vehicles, it is important from the point of view of safety that an operator operating (driving) with his or her eyes forwardly fixed to the front, when changing the visual point in an instant and looking at a display such as a velocity display, can accurately read out the displayed contents for the shortest possible time.

In recent years, in vehicles, particularly automobiles, there has been a strong movement to adopt a so-called "head up display (hereinafter referred to as a HUD)" which has been developed in aircraft. In this HUD, the displayed image of a CRT is projected on a combiner (semitransparent reflection plate) disposed at the front of a pilot's seat (or on a windshield) with an optical system such as lenses, mirrors, and holograms, and is displayed in a form superimposed upon the forward scene. As a result, the HUD becomes a unit which makes it possible to reduce movement of one's eyes or focusing as much as possible and to enhance visibility.

In the railroad vehicles, there is plenty of space for housing an image display section, and as shown for example in Published Unexamined Patent Application No. H4-110236, the image display section is comprised of considerably large-scale devices such as a CRT, a lens, a mirror, and a concave mirror.

On the other hand, in the automobiles, space for housing an image display section or an optical system is limited, and as shown for example in U.S. Pat. No. 4,740,780, U.S. Pat. No. 4,664,475 or "Development of Hologram Head-up Display" (SAE TECHNICAL PAPER SERIES 920600, (1992) by H. KATO et al.), liquid crystal or a LED is used as the image display section and is combined with an optical system such as a mirror, and the combined unit is housed in a compact form in an instrument panel. However, in order to form a focus at a great distance, the reflections at the mirrors are repeated to obtain a long optical path leading from the image display section to the combiner. For this reason, a certain space has become necessary. Thus, these optical systems are housed in the instrument panel, but it is desirable that the use of the space be avoided where various kinds of devices or wiring are close together, and if possible, it is desirable that the use of this space be avoided. That is, a conventional HUD such as this is an excellent display where the forward external scene and various kinds of image information and character information from the interior can be superimposed and viewed at front of the driver's seat, but in order to achieve this, the conventional HUD has a large problem that a considerable space must be occupied.

This problem originates in the fact that the HUD takes the projection type display structure that the image generated in the image display section is projected and displayed on the combiner surface. The HUD, as previously described, is originally a system which has been developed in aircraft, and various functions that had been required in that case, as they are, have been applied to vehicles, etc. Therefore, it is considered that the requirements which cannot always be said to be indispensable in vehicles have also been introduced as they are.

In aircraft, the forward view's space is a wide space where the field of view is not much obstructed, and the operator is operating focusing the visual point at the infinite point. Therefore, it is preferable that the image of the HUD be also focused at the infinite point. In addition, even if considerably complicated information were displayed on the display, it would not become an obstacle to the operation of the operator, and conversely, the operator does need such complicated information.

On the other hand, in vehicles, particularly automobiles, the driver is driving, viewing about 10 to 20 m ahead, about 50 m ahead at the most. Also, the forward external scene is full of variety, and the operator is looking at an ever-changing sight, such as scenes, various kinds of display plates, and forward vehicles. If extremely complicated information is displayed on the display, conversely it will become an obstacle to driving. When the driver looking about 20 m to the front looks at an image displayed between the driver and the front, it has been said that the driver can recognize the image without difficulty if the focus is formed about several meters ahead. Furthermore, extremely speaking, it is considered that, as long as the forward scene and the display information are superimposed and can be seen and in a case where both are in the field of view at the same time even if the display information were not in the same focal distance as the forward scene, the forward scene and the display information can be read out without having a feeling of incompatibility or fatigue so much, unlike looking at the displays of the meters of a normal instrument panel section.

If a complicated and fine image is displayed, then a suitable image display device, i.e., a CRT, a TFT transmission liquid display, etc., will be needed. In the present technique, it will be inevitable that the display device will become a projection type in order to display the image while superposing upon an external scene. In addition, in the projection type, in order for an image to be formed so as to have a focus far ahead, an optical system such as a lens or a mirror will become necessary. However, if it is assumed that a complicated image is not displayed unlike the aforementioned case, the limitation that a CRT is used in the image display section in order to make a projection type will be removed, and it will become possible to drastically change the concepts of the HUD.

As described above, in the automobiles, the space for housing an image display unit or an optical system is limited, and if possible, it is desirable that the use of this space is be avoided. A method of solving this problem is by using a transparent and flat image display unit to make a direct view type rather than the projection type, and by arranging this display unit in the vicinity of the windshield. If done like this, the driver can superimpose and look at the forward external scene and the display information at the same time and drive safely. At this time, what is necessary is that the image portion of this image display unit maintains a fixed brightness. A transparent electro-luminescent display can be simply used but is extremely expensive, and a passive image display unit is practical. However, an illumination system is needed in order for making use of this display unit, and this illumination system is also required to be transparent and flat.

DISCLOSURE OF THE INVENTION

While the conventional HUD has the drawback that it requires a large housing space because of the structure, the object of the present invention is to provide a HUD where a substantially transparent display, an optical system, and an illumination system are united in a body and which is compact and makes a housing space unnecessary.

The present invention provides the following means in order to achieve the object.

That is, the present invention is a head up display unit comprising: transparent and flat image information display means; transparent and flat light irradiating means arranged in an opposed and close contact relationship with said image information display means; light supply means for supplying light to said light irradiating means; image-display control means for controlling the image display of said image information display means; and light-supply control means for controlling the light supply of said light supply means.

It is preferable that the transparent and flat image information display means be a liquid crystal panel, particularly a polymer dispersed liquid crystal panel. Also, an electric shutter comprising a ferroelectric thin material is suitable. And, said transparent and flat light irradiating means arranged in an opposed and close contact relationship with said image information display means is light irradiating means which has optical-path converting means for emitting incident light which was incident from said light supply means arranged on part or all of the peripheral edge of said light irradiating means, in a surface direction of said light irradiating means. It is preferable that the optical-path converting means be a volume phase hologram, a phase diffraction grating comprising asymmetrical unevenness, or a half mirror. And, a light source itself emitting light, such as various kinds of lamps. A discharge tube, an electroluminescence, a plasma illuminant, a light emitting diode, and a laser, can be used as the light supply means for supplying light to said light irradiating means. Also, the light supply means may be light supply means comprising a phosphor and a light source which excites said phosphor, or may be light supply means comprising a phosphor, a light source which excites said phosphor, and an optical fiber for guiding light from said light source. Furthermore, the light supply means may be provided with a light source, an optical fiber for guiding light from said light source, and optical-path converting means for changing the direction of the light emitted from the light source or the optical fiber. A volume phase hologram having a function of the same kind as that used in the aforementioned light irradiating means, a phase diffraction grating, or a half mirror can be used as the optical-path converting means.

Also, it is particularly suitable for the present invention that the image portion displayed in said image information display means is image information display means having a light scattering ability. An important form of the present invention is to use a polymer dispersed liquid crystal as image information display means.

Also, it is important that the light irradiating means for illuminating the image information display portion is a surface illuminant which is substantially transparent when viewed from the driver side and which effectively illuminates the image information display portion. The use of a hologram which is capable of arbitrarily setting the directions of incident light and emitted light is effective. An important form of the present invention is to use a volume phase hologram as light irradiating means.

Also, in order to obtain a much more compact device and a high luminance of image display, it is possible to make a device equipped with both image information display means and light irradiating means. In order to realize a transparent and flat reflection display device of the direct vision type where light utilization efficiency is high, the present inventors have eagerly searched for the distribution state of the composite of a high polymer and liquid crystal composing a polymer dispersed liquid crystal. As a result, it has been found that a liquid crystal display can be realized whose operation is entirely different in an improved distribution state from prior art and whose scattering efficient is extremely high. The liquid crystal display comprises: two substrates having electrode layers, at least one of said substrates being transparent; and a light regulating layer composed essentially of a liquid crystal phase and a high-polymer phase, interposed between the substrates. The liquid crystal and high-polymer phases of the light regulating layer are essentially distributed as hologram patterns made by object light and reference light reflected at a scattering surface. Because this novel polymer dispersed liquid crystal display itself has a hologram function, it serves both as the image information display means and the light irradiating means of the present invention and is an important form of the present invention. The light regulating layer is a light regulating layer comprising a combination of a liquid crystal phase and a high-polymer phase which vary including points where a value of a refractive index of said liquid crystal phase with respect to incident light becomes equal to a refractive index of said high-polymer phase, when a voltage is applied and a refractive index of said liquid crystal phase is varied. With this, the entire device can easily be made transparent.

The information displayed on the HUD is not very complicated information, but it is preferable that the image be colored. As one of the methods for achieving this, the optical-path converting means, in the light irradiating means which is a volume phase hologram, may be constituted by said volume phase hologram where holograms differ at every section. This is one of the features of the present invention. In a case where the light irradiating means having the optical-path converting means constituted by the holograms differing at every section is arranged in an opposed relationship with said image information display means, coloring can be easily realized if display is controlled so that fixed image information is displayed in correspondence with each portion of the different holograms. As a finer form, the light irradiating means comprises a light source, a transparent substrate, and a volume phase hologram formed on the transparent substrate. The tricolor light, which is emitted from said light source and propagates through the said substrate, is spaciously separated and focused by said hologram and form light spot groups arrayed in the form of a mosaic on a plane. Also, a hologram, where tricolor dot patterns are shifted one pitch by one pitch and are multi-recorded, is regenerated with the tricolor light which is emitted from said light source and then propagates through said substrate, whereby groups of three color light spots, arrayed in the form of a mosaic, are formed. Furthermore, the color of light is changed by alternately switching the colors of a light source in a time series manner or alternately switching a tricolor filter in a time series manner, each color light is propagated through a transparent substrate, and color illumination light information for uniformly illuminating the transparent substrate surface, multi-recorded on the hologram, are regenerated, whereby tricolor illumination light which is switched in a time series manner is formed. These are techniques which can be utilized in common in a case where the image information display means and the light irradiating means are separately formed and in a case where they are integrally formed.

In order to fabricate a liquid crystal display serving both as image information display means and light irradiating means, a light regulating layer precursor is interposed between two transparent substrates having electrode layers, the light regulating layer precursor essentially including (1) a liquid crystal material, (2) a monomer and/or oligomer, (3) a photopolymerization initiator system which is activated by a chemical active radiant ray. Then, both reference light of a coherent chemical active radiant ray and object light, where the same radiant ray is reflected at a scattering reflection surface, are irradiated, in order to form in said light regulating layer precursor an interference pattern forming a hologram. And, photopolymerization is performed to form the display. In this case, the coherent light reflected at the scattering reflection surface interferes with the coherent light from the adjacent very small scattering surfaces, and consequently, there is a high possibility that a noise grating is formed. In order to prevent this, the present invention uses a hologram pattern made by the object light obtained by irradiating laser light to a special scattering plate where very small scattering areas for randomly scattering incident light are arrayed in the form of a mosaic. Also, said hologram pattern may be made with the object light passed through a pin hole array and reference light. Also, said hologram pattern may be made with the object light obtained by irradiating S-polarization light and P-polarization light, laser light of different wavelengths, or sets of incoherent laser light beams irradiated from different laser devices, arrayed in the form of a mosaic, to the scattering plate, or by passing these light beams through the pin hole array. Also, the said hologram may be formed over the entire surface of said light regulating layer, with the object light obtained by irradiating laser light to a mask having a fine pattern and a scattering surface and by scanning coherent reference light in synchronization with the object light.

The liquid crystal display serving both the image information display means and the light irradiating means is equipped at least with said liquid crystal display device, a signal generator for transmitting a signal such as an image to the display device, and a light source or light supply means for supplying light to said liquid crystal display device. This display forms an important form of the HUD of the present invention. This light source or light supply means is arranged on one end of a transparent substrate constituting said liquid crystal display, and the hologram pattern of the light regulating layer is formed so that the light incident from the end of the transparent substrate scatters and reflects light in direction nearly perpendicular to the substrate surface. This is also included in the present invention.

Furthermore, the light irradiating means is functionally incorporated in this liquid crystal display, and if light irradiating means having an optical-path converting means such as a volume phase hologram, i.e., a flat illuminator is used together, the degree of freedom of the direction of incident light will be enlarged and this embodiment will become more useful.

Incidentally, for the light irradiating means of the present invention, various modes are possible depending upon the direction of the light diffracted by the hologram.

As one of the various modes, a liquid crystal display comprises a polymer dispersed liquid crystal display device, a hologram arranged on a transparent substrate, and a light source. The polymer dispersed liquid crystal display device is illuminated by light of said light source which is incident from an end surface of said transparent substrate and which is emitted from a surface of said transparent substrate in an inclined direction by said hologram. With this, the light or unnecessary light diffracted by the hologram is removed, and only the light scattered by the polymer dispersed liquid crystal display device will get to an observer.

Also, a liquid crystal display may comprise a polymer dispersed liquid crystal panel containing a dichroic dye, a hologram provided on a transparent substrate, and a light source. Light is diffracted at a predetermined angle toward said liquid crystal panel by said hologram where the light from the light source is incident from the end surface of the transparent substrate, and said liquid crystal device is illuminated. A transparent substrate provided with a hologram is closely arranged at the back of said polymer dispersed liquid crystal panel containing a dichroic dye, and said hologram is formed so that diffracted light is emitted obliquely with respect to the substrate, when light from the light source is incident. This case is useful as a transmission direct vision type. On the other hand, a transparent substrate provided with a hologram is placed at the front of said liquid crystal panel. A light absorbing plate is additionally placed at the back of said polymer dispersed liquid crystal panel containing a dichroic dye, and said hologram is formed so that diffracted light is nearly emitted in parallel to the substrate. This case is useful as a reflection direct vision type.

In general, a reflection liquid crystal panel has a reflecting plate at the back thereof and does not use a special light source. An image is viewed making use of surrounding light and the reflection efficiency is bad, so only a dark image is obtained. Therefore, if a display is constituted by a reflection liquid crystal panel, a hologram arranged on the front surface of the panel, and a light source, and if, when light is irradiated to said hologram, said hologram is recorded so that diffracted light is emitted nearly perpendicularly toward the liquid crystal panel, then there will be obtained a display where a bright image is obtainable. This case is also a useful form of the present invention.

Because the HUD of the present invention is transparent and thin, it is easily placed on a dashboard of an automobile, has a drive portion which can be pulled down before and after, and can be fixed at an arbitrary angle. Also, the HUD can be fixed by a freely rotatable fixing tool attached to the upper portion of a windshield of an automobile and can be pulled down to the windshield surface when it is used. This is particularly suitable in the case of the reflection display. In addition, the HUD is placed in the vicinity of a rear window of an automobile and can display image information to the outside. Furthermore, the HUD can be used in part or all of a windshield of an automobile. Likewise, the HUD can be used in part or all of a rear window of an automobile.

The HUD of the present invention has become a HUD where transparent and flat image information display means and an optical system such as transparent and flat light irradiating means are united in a body and which is compact and makes a housing space unnecessary. With this, a bright image can be viewed superposing it upon external scenes.

BRIEF DESCRIPTION OF THE DRAWINGS

FIG. 11 shows an example of the function of the HUD of the present embodiment.

FIG. 16 shows the method of fabricating a mosaic tricolor spot group.

FIG. 17 shows the method of fabricating a mosaic tricolor spot group.

FIG. 18 shows a dot pattern of the same tricolor spot group.

FIG. 19 shows a dot pattern of the same tricolor spot group.

FIG. 20 shows a dot pattern of the same tricolor spot group.

FIG. 21 is a side view of a diagram useful for showing the production of a hologram.

FIG. 22 shows a light source for emitting tricolor light.

FIG. 23 shows a light source for emitting tricolor light.

FIG. 39 is a diagram for explaining a method of fabricating a polymer dispersed liquid crystal layer by the use of a special scattering plate or a pin hole array.

BEST MODE FOR CARRYING OUT THE INVENTION

The present invention unites in a body a display serving as an image information display section and an optical system such as a light irradiating section for applying light to the display, and provides a compact HUD which can be arranged and used directly on a windshield or in the vicinity. The invention will hereinafter be described in detail with drawings and embodiments.

(A)

Figure 1:
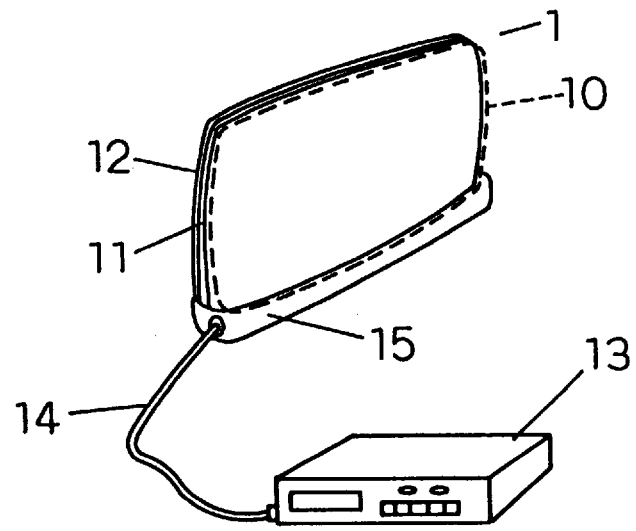
FIG. 1 shows the basic construction of a HUD of the present embodiment and an example of the HUD installed in an automobile.
Figure 2:
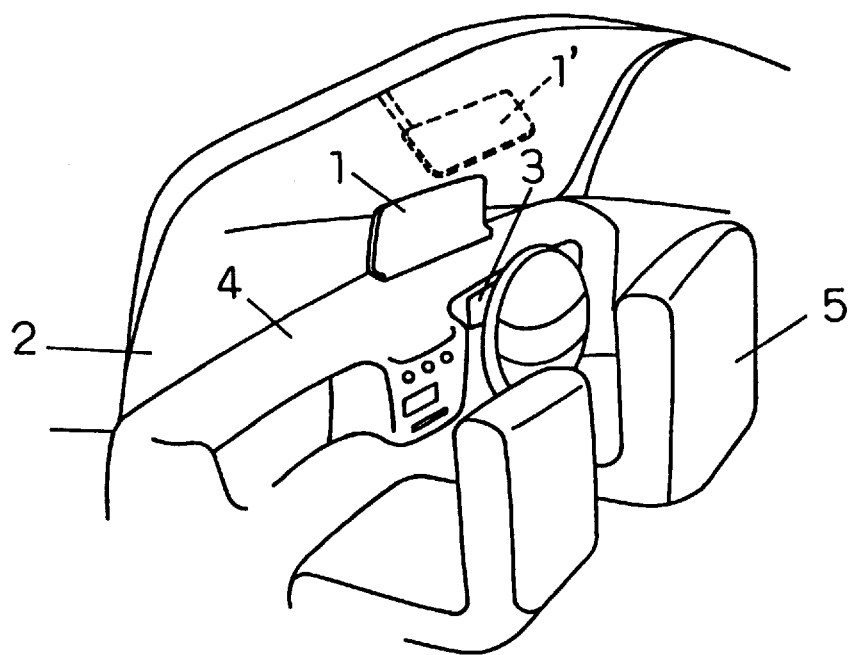
FIG. 2 shows the basic construction of a HUD of the present embodiment and the example of the HUD installed in an automobile.
Figure 3A:
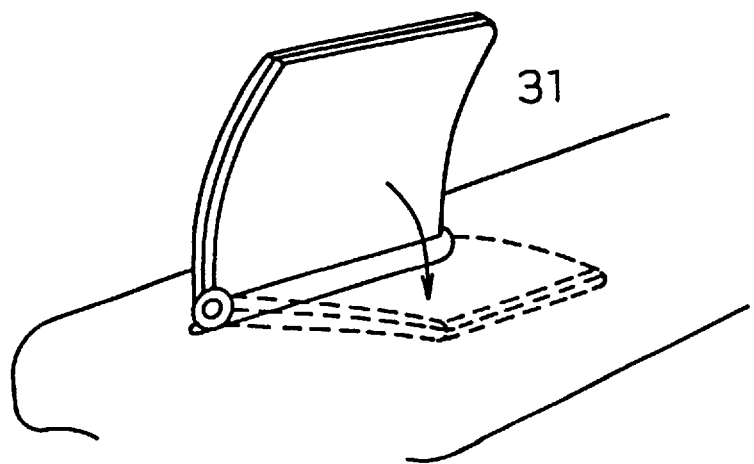
FIG. 3 shows the basic construction of a HUD of the present embodiment and an example of the HUD installed in an automobile.
Figure 3B:
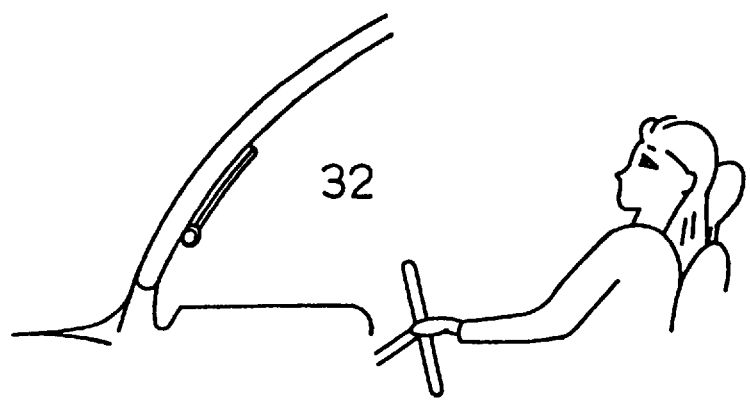
Figure 4:
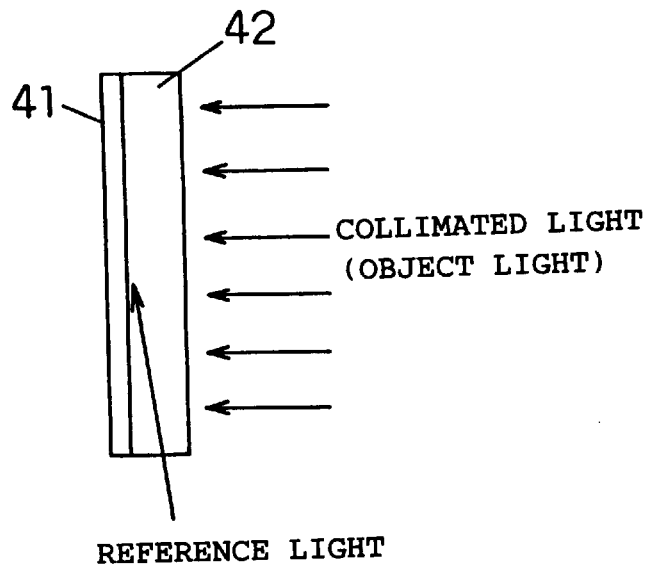
FIG. 4 shows an example of the light irradiating means of the HUD of the present embodiment.

FIG. 2 shows an example of the HUD of this embodiment placed in the interior of an automobile. In FIG. 2, reference numeral 1 is the HUD of this embodiment, 2 a windshield, 3 a conventional instrument display section at an instrument panel section, 4 a dashboard, and 5 a driver's seat. FIG. 1 shows the basic construction of the HUD 1. 11 is a transparent and flat light irradiating means section, 12 a transparent and flat image information display means section, 15 a light supply means section, 13 a control unit, and 14 a connecting cable. Because the HUD of this embodiment can be fabricated into a transparent and thin type, it does not become any obstacle of the visual field even when the driver sitting on the driver's seat 5 shown in FIG. 2 is looking at forward external scenes. In FIG. 2 the HUD 1 is placed in the vicinity of the windshield and in front of the driver, so the display information can be read out superposing it upon forward external scenes. Since the HUD 1 is connected to the control unit 13 and the cable 14 and is a stand-alone type, it can be set in an arbitrary place. Reference numeral 1' indicated by a dotted line of FIG. 2 is an example of installation where the HUD is attached like a sunvisor and is pulled down forward of the driver's seat as needed. FIG. 3 shows other examples of installation, and 31 of (a) is a case where movable sections are provided in the left and right bottom portions of the HUD and where the HUD is placed on to the frame portion in front of the driver's seat so that it can be used pulling down before and after, and the HUD can be put up at an arbitrary angle and used when necessary, and can be put down when unnecessary. Also, 32 of (b) is a structure where the HUD section is attached directly to the windshield and is a type which takes the least space. Furthermore, it is also easy for those having skill in this field to incorporate this HUD into a laminated glass as part of the windshield, or the HUD itself becomes a windshield and the whole window can also be used as an image display section.

In order to install the image display means 12 on the windshield of an automobile or in the vicinity and to display image information while superposing it upon external scenes, a transparent display with a certain light transmittance is required as the image display means 12. A passive display, such as an electro-chromic display (ECD), a liquid crystal display (LCD), a dichroic-particle scattered display (DSD), a ferroelectric thin-film display (FED), and a ferromagnetic display (FMD), can be used as the image display means. Among these, LCDs and FEDs are more suitable, considering durability, cost, and temperature characteristic. If these transparent displays are placed in front of the driver's seat and a forward external scene is superimposed and observed by the driver, then character information on the display, for example, can be recognized through external light. However, since this case (LCD, etc.) uses a polarizing plate, the transmittance is generally reduced, and this case depends upon the brightness of external light, so the high contrast is difficult to obtain. Also, naturally, an image cannot be viewed during night, or where there is no light, such as a tunnel. Therefore, there is a method where a lamp placed in a suitable position in an automobile is used as a light source for irradiating light toward a display, but there is a high possibility that the relative position between the display and the light source will be fixed and that a wasteful space will take place. Therefore, it is most desirable that a display and an illumination device consisting of light irradiating means and light supply means be united in a body, as in the case of the embodiment of the present invention. The properties of this illumination device requires that the device be transparent, that the incident light from part or all of the end surface of the light irradiating means be irradiated toward the display and the irradiation of the light in the opposite direction be extremely small, and that the reflected light at the display surface and the transmitted light from the external scene be sufficiently passed through.

As one of the light irradiating means meeting such requirements, there is a surface illuminant using holography.

Figure 5:
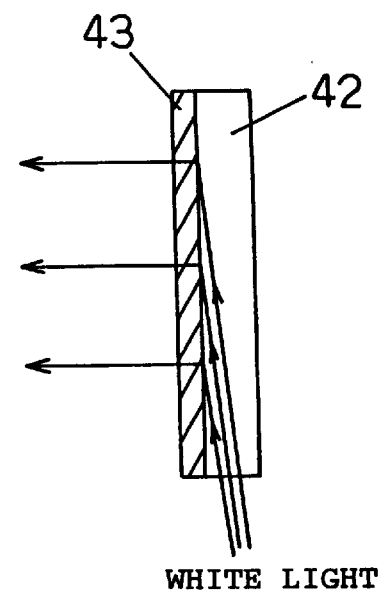
FIG. 5 shows the example of the light irradiating means of the HUD of the present embodiment.
Figure 8:
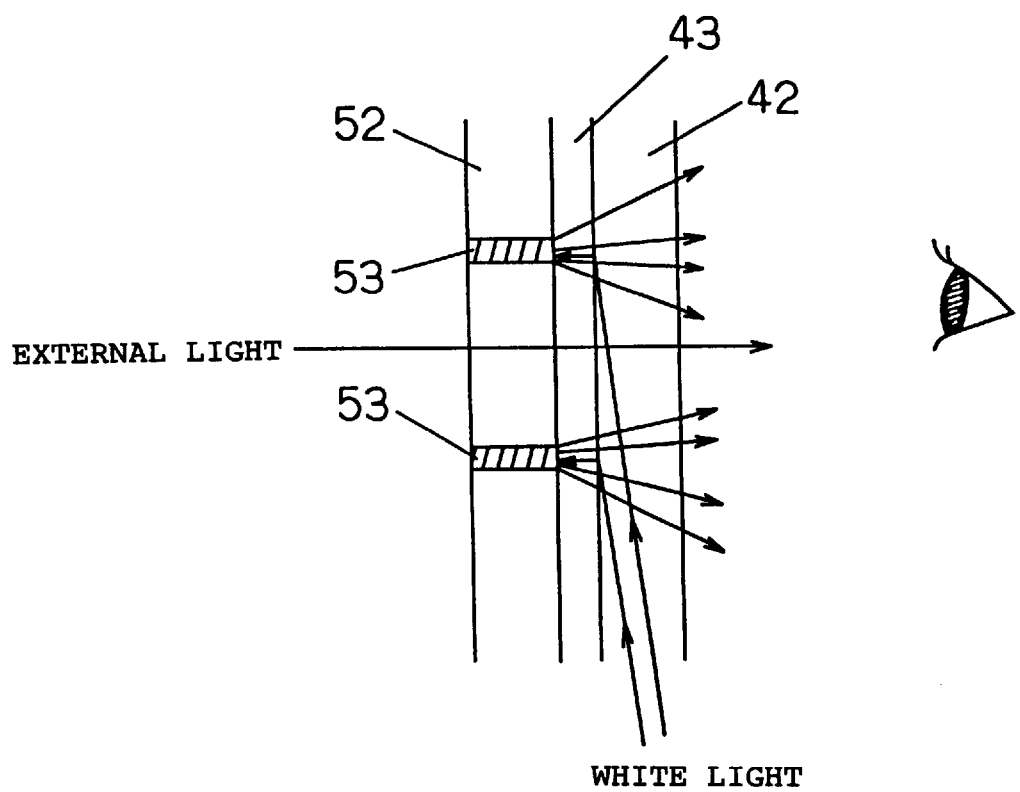
FIG. 8 shows an example of the structure where the light irradiating means of the HUD of the present embodiment is a volume phase hologram and the image information display means is high-polymer dispersed liquid crystal.

FIGS. 4 to 7 show the concepts of the surface illuminant. When a hologram is generated, simple collimated light is used in FIG. 4 as object light, instead of using the reflected light of the light irradiated to an actual object surface. The collimated light is irradiated perpendicular to a hologram photosensitive body surface 41, and reference light is irradiated at an angle nearly perpendicular to this collimated light, thereby generating a hologram. 42 is, for example, a transparent acrylic plate. An illumination device, formed integrally with a light source as a normal holography for displaying a three-dimensional image rather than a surface illuminant like this embodiment of the present invention, has been proposed by A. S. Benton et al. ("Edge-Lit Rainbow Holograms," SPIE, Vol., 1212, pp. 149–157, 1990). The surface illuminant of this embodiment can be fabricated by the same method, except that collimated light is utilized without using an actual object, as described above. FIG. 5 shows a hologram made in this way, and if white light is introduced from the bottom portion (from the direction of the reference light), it will be diffracted at a hologram surface at 43 and will be emitted in a direction nearly perpendicular to the surface (direction of object light). It is preferable that this hologram be made in a volume phase type. That is, a photosensitive resin whose refractive index is varied by light irradiation is used, and a phase distribution corresponding to a light intensity distribution of an interference fringe is realized. Therefore, the diffraction efficiency is high and the direction perpendicular to the surface is nearly transparent. External light is transmitted through without undergoing any influences, and the driver can look at an external scene as if looking through normal glass. The light emitted from this illumination device strikes upon a display surface which is placed in an opposed relationship with the illumination device and then is reflected. FIG. 8 illustrates this state. It is desirable that the displayed image of a display at 52 be a scattering type, and among LCDs, polymer dispersed liquid crystal is particularly desirable. The polymer dispersed liquid crystal is made from the structure where liquid crystal is scattered into a high-polymer matrix. The polymer dispersed liquid crystal becomes transparent when an electric field is applied, and reaches an opaque scattering state 53 when an electric field is off. This is not limited to polymer dispersed liquid crystal, but whatever capsules liquid crystal or whatever becomes a scattering type can be used. Because these displays are used without employing a polarizing plate, a particularly bright image is obtained. The light incident upon the display surface, as shown in FIG. 8, is scattered at an image displaying portion 53 and is reflected in equal directions. The reflected light passes in part through the hologram and is diffracted in the direction of the light source, but the reflected light has the excellent characteristic that the greater part thereof is transmitted through toward the driver side and is observed as a bright image, because the reflected light has become scattered light.

Figure 6:
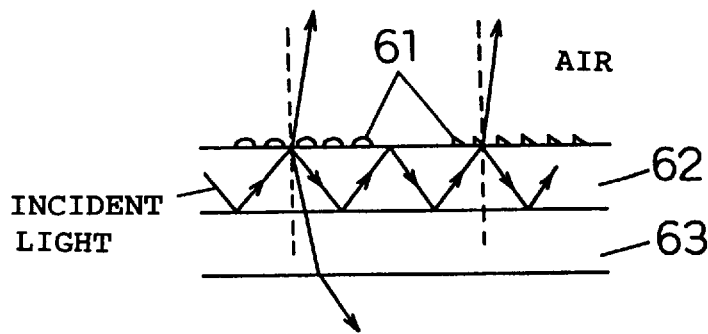
FIG. 6 shows the example of the light irradiating means of the HUD of the present embodiment.
Figure 7:
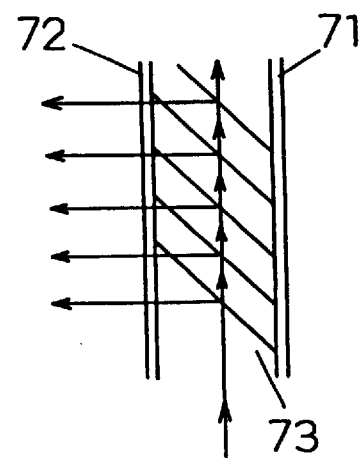
FIG. 7 shows the example of the light irradiating means of the HUD of the present embodiment.

For this light irradiating means, the aforementioned hologram is one of the most suitable means, but some other methods can be utilized. That is, the function of the light irradiating means, as previously described, is that the device is transparent, that the light incident upon the end surface of the light irradiating means is converted in optical path and is irradiated to the direction of the display, that the irradiation of the light to the opposite direction is extremely small, and that the reflected light from the display surface is sufficiently transmitted through. Therefore, whatever meets these functions can be utilized. For example, what is shown in FIG. 6 is called a waveguide hologram or a grating coupler and is art known to those having skill in this field. A diffraction grating 61 is provided on the surface of a film 62 arranged on a transparent support (glass, for example) 63. By making the refractive index of the film 62 greater than that of the support 63 and that of the air on the surface, the light introduced to the film 62 in a fixed direction will meet total-reflection requirements and can be propagated through the film. The so-called evanescent light which has reached the diffraction grating section interacts with the diffraction grating, thereby emitting light to the outside. By controlling the spaces of the diffraction grating, light can be taken out in a nearly perpendicular direction. Although, in general, this diffracted light is emitted in up and down directions as shown in the left portion of FIG. 6, it was possible, according to this embodiment, that the most part of the diffracted light were emitted in one direction, by forming the shape of the diffraction grating into an asymmetrical shape such as a sawtooth shape (right portion). This diffraction grating made by holography is called a waveguide hologram. In addition, in FIG. 7 a half mirror 73 interposed between two transparent support plates 71 and 72 is shown as a simpler method. The incident light introduced from the bottom is reflected in part at the half mirror and is emitted in the surface direction. If the angle of the half mirror is set, for example, to 45 degrees, then the reflected light can be taken out in the direction perpendicular to the surface. The remaining light is transmitted through the half mirror and reaches the next half mirror. This operation is repeated and light is sequentially taken out in the surface direction, so the half mirror functions as a transparent surface illuminant.

Figure 9:
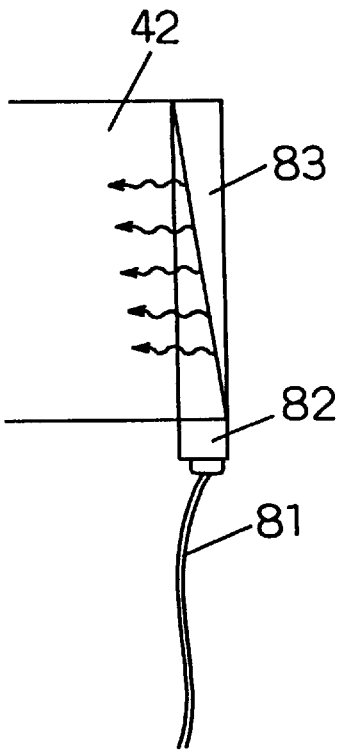
FIG. 9 shows an example of the light supply means of the HUD of the present embodiment.
Figure 10:
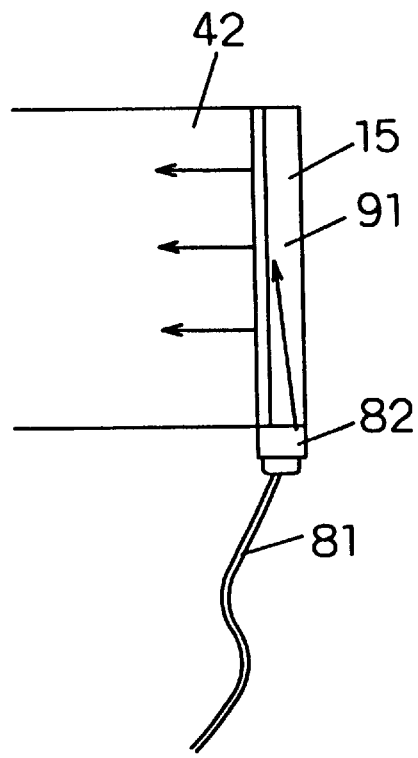
FIG. 10 shows an example of the light supply means of the HUD of the present embodiment.

For the light supply means (15 of FIG. 1) for supplying light to the aforementioned light irradiating means, light sources of any types where the source itself emits light, such as various kinds of lamps, a discharge tubes, electroluminescence, a plasma illuminant, a LED, and a laser, can be used. Also, as shown in FIG. 9, light is guided with an optical fiber 81 connected to a suitable light source, and the light is irradiated through an optical system 82 (lens, prism, etc.) to a phosphor 83 in a fixed direction or as a magnified light beam, whereby the light can also be supplied in the direction of 42. It is also possible to directly connect a light source instead of the optical fiber. As another example, as shown in FIG. 10, light is introduced in the same way as FIG. 9. In this case, optical-path converting means 91 having the same function as the aforementioned light irradiating means is used, whereby it can be operated as a light source with respect to 42. Now, for the HUD of the embodiment of the present invention, an example of the operation will be described.

(Embodiment-A1)

In FIG. 11, 101 is a polymer dispersed liquid crystal panel. Liquid crystal/monomer/prepolymer (for example, E-8/2-ethyl hexyl acrylate/urethane acrylate oligomer, made by BDH) is sandwiched between glass substrates having transparent electrodes, a photopolymerization initiator is added, and photopolymerization is carried out with UV light, whereby the polymer dispersed liquid crystal panel was obtained. The entire size of the panel was set to 21 cm×16 cm×0.2 cm. The display portion is segmented into three zones, and the electrodes are patterned so that "Divergence after xx m" is displayed on 102, symbols of an intersection and an arrow are displayed on 103, and speed such as "ΔΔkm" is displayed on 104. In the portion of the zone of 102, where the display changes, there are only numerical characters representative of distance, and the other portions are fixed. In the zone of 103, symbols of an intersection and arrows have been displayed, and they will change, for example, with a simple line display such as shown by dotted lines. Also, in the zone of 104, numerical characters representative of speed will change. A simple character display such as this does not require a dot matrix, a simple pattern can be used for the electrodes, and wiring can be easily taken out by using the peripheral portion of liquid crystal. 105 is an electrode wiring lead socket, and 106 is a lead cable connected to the control device. 107 is a surface illuminant using holography. For example, a piece of Dupont HRF-700 sheet is stacked upon a glass plate (or acrylic plate) of thickness 0.4 cm as a photosensitive body, and collimated light and reference light are irradiated as previously described. In this way, a hologram was made. At this time, the photosensitive sheet is segmented into three zones 108, 109, and 110, as shown, and when making holograms, the photosensitive sheet is exposed with three light sources which is different in wavelength. In this way, three kinds of holograms are made on a single surface illuminant. These zones correspond to the zones 102, 103, and 104 of liquid crystal. 111 is a light source, and a cold cathode FL lamp was used. 112 is a reflecting plate, and 113 is a light source cable, which is coupled to a controller that controls the on-off of light and light regulation. 101 and 107 are superimposed to make a HUD. If 111 is lit, the zones of 108, 109, and 110 will respectively irradiate light beams of different wavelengths toward the liquid crystal surface. That is, there becomes a tricolor display whose color differs at every zone. This liquid crystal is transparent at the time of voltage application, and an image is displayed in the off state of the liquid crystal. Therefore, first the liquid crystal is set to the ON state at the time of operation and then is set to the OFF state according to an image signal. If the light source is lit with the liquid crystal in the transparent state, the light irradiated from 107 will pass through the transparent liquid crystal and be emitted to the outside, and the liquid crystal remains transparent when it is viewed from the internal driver. If, in accordance with the characters of an image, a signal is sent from the image control section and the liquid crystal is set to the OFF state, the image will be displayed as a scattering surface. Then, the light irradiated from 107 strikes upon the scattering surface and is reflected, and the image displayed in three colors at every zone is brightly observed to the driver. For the external scene, the liquid crystal is transparent except for the scattering surface of the liquid crystal and therefore the image superimposed upon the external scene is seen. If the aforementioned zone is further segmented, it will also be possible to display each character of each image with a different color. The aforementioned HUD is the simplest form of this embodiment and the basic operation has been illustrated. As has already been described in detail, this HUD can be made more compact and can be operated with bright display, by combining various kinds of image information display means, light irradiating means, and light supply means.

The HUD of this embodiment makes not only various displays in front of the driver's seat, but also if it is placed in the rear widow portion and used, it can be utilized as an effective warning with respect to the following vehicles, i.e., as a so-called center high mount stop lamp. Also, it can be used as an information transfer display. At this time, if the surface illuminant is directed toward the vehicle inner side, then a white display image will be seen from the following vehicle as if it floats on the bright display, and it will become a display whose visibility is excellent. Of course, it is possible that the HUD will be used in part or all of the rear window.

(B)

Next, a description will be made of a general method of coloring the head up display of this embodiment. As already described, it is easy to color the zones at every character. A description will hereinafter be made in detail of the case of a finer image. In this case, the hologram as light irradiating means, which is used in this embodiment, is utilized. This hologram is transparent in external appearance and is referred to as an optical element for applying colors of red, green, and blue to each pixel of the display device. With a combination of this optical element and the polymer dispersed liquid crystal display device, there can be provided a unit which is transparent, is capable of a color display, and is a direct visual type.

(Embodiment-B1)

Figure 12:
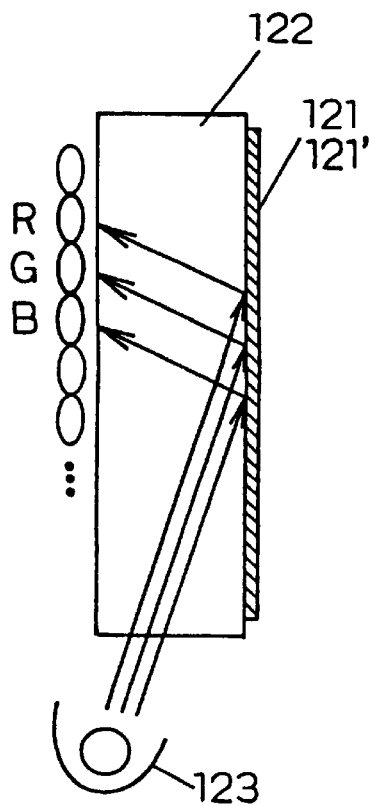
FIG. 12 shows an example of a mosaic tricolor spot group in a volume phase hologram of the light irradiating means of the present embodiment.
Figure 13A:
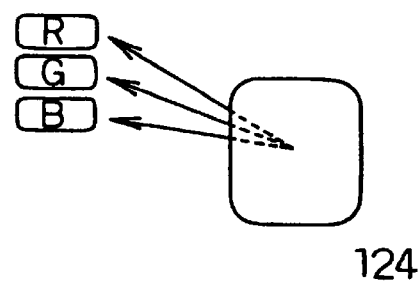
FIG. 13 shows the example of a mosaic tricolor spot group in a volume phase hologram of the light irradiating means of the present embodiment.
Figure 13B:
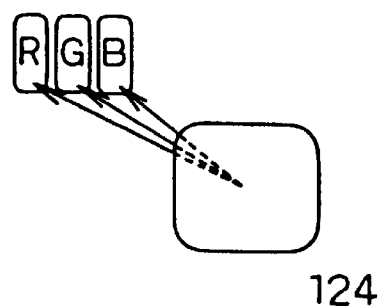
Figure 14:
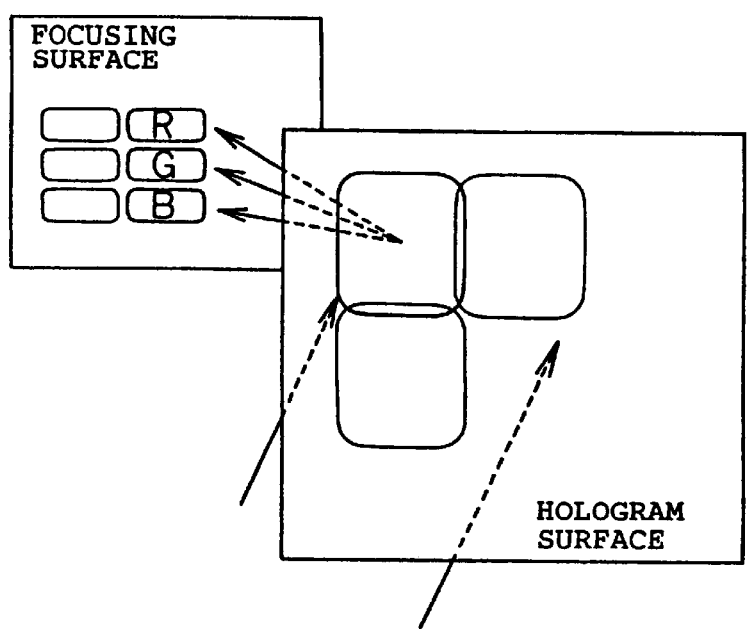
FIG. 14 shows the example of a mosaic tricolor spot group in a volume phase hologram of the light irradiating means of the present embodiment.
Figure 15:
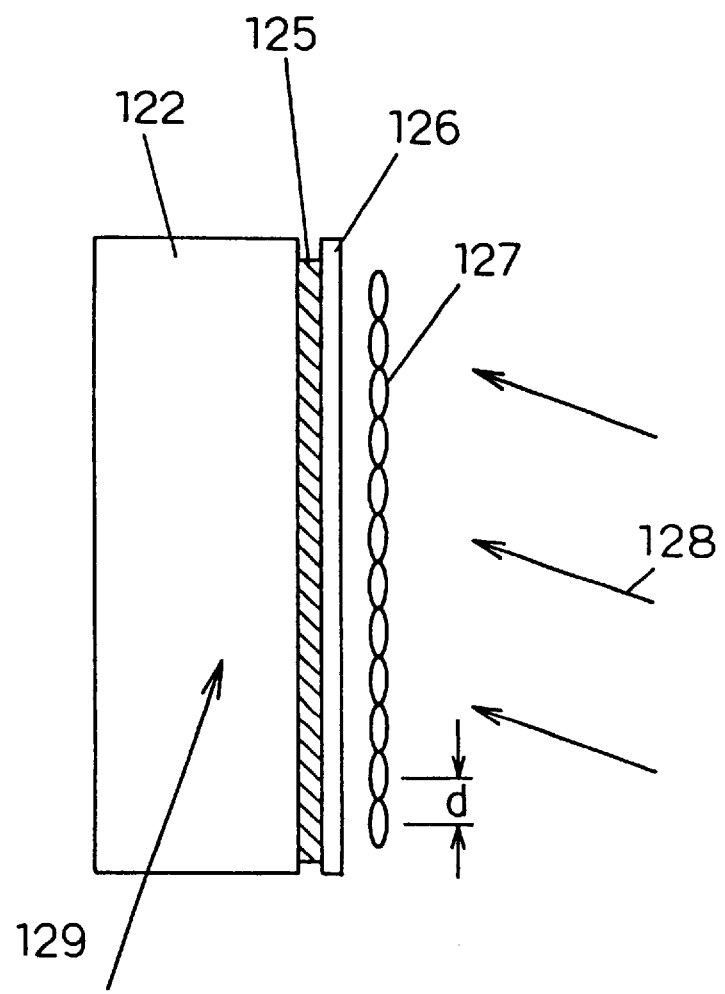
FIG. 15 shows a method of fabricating a mosaic tricolor spot group.

FIG. 12 is a principle diagram of the optical element in this embodiment, FIG. 13 a diagram showing the function of the minimum unit area of the hologram, and FIG. 14 a birds-eye view of the whole hologram. In FIG. 12, 121 is a volume phase hologram, 122 a transparent substrate, and 123 a light source. The hologram 121 has a function of converting the light from the light source 123 into a light spot group where red, green and blue are regularly arrayed. Three element holograms, which diffract light of three colors in different directions and focus the light, are multi-recorded on the minimum unit area 124 of the volume phase hologram shown in FIG. 13. For the diffraction direction by each color element hologram, a vertical direction such as that shown in FIG. 13(a) or a horizontal direction such as that shown in FIG. 13(b) can be taken as an example, but the diffraction direction is not limited to these directions. As shown in FIG. 14, a large number of minimum unit areas 124 exist in the hologram 121, and they are adjacent to or overlapped with one another. As a consequence, the minimum unit areas 124 are disposed so that the regenerated light becomes a mosaic tricolor light spot group on the focus surface. Each element hologram is regenerated only by both the light of the color used when recording and the light having a wavelength in the vicinity of the color, but it is not regenerated by light of a color different from that. This is a characteristic found only in the volume phase hologram. Next, a description will be made of the fabrication process of the hologram. In FIG. 15, 122 is a transparent substrate, 125 a hologram recording material, 126 a protective film of the hologram recording material, 127 a lens let array, 128 recording light, and 129 reference light. FIGS. 16 and 17 are views showing part of FIG. 15 on an enlarged scale. The hologram recording material 125 is coated between the transparent substrate 122 and the protective film 126. For the recording material of the hologram, a photopolymer or gelatin bichromate, where high diffraction efficiency is obtained and where there is less noise light, is suitable. In this embodiment, a photopolymer was used. First, the recording light 128, which is, for example, red laser light, is focused by the lens let array 127. This state is shown in FIG. 16 on an enlarged scale. While in FIG. 16 the recording light has been illustrated so as to be irradiated horizontally, this embodiment is not limited to this. The hologram recording material 125 is put between the lens let array 127 and the focal plane. Thus, a light intensity pattern caused by the interference with the reference light 129 of the same color is recorded on the hologram recording material 125 as a refractive index profile. Now, if the recorded pattern is regenerated by irradiating light at a regenerative-light optical path 130 of the same optical path as the reference light 129, a red light spot group arrayed at the intervals of same cycle as the basic cycle "d" of the lens let array 127 will be formed on a single plane 131. In order for the regenerated light spot group to be disposed at very fine intervals of "p" from the point of view of formation of a color image, the lens let array 127 is shifted at intervals of a fixed distance "p" and the recording process is further repeated. This process is repeated d/p times. Next, this process is repeated with a green laser beam. At this time, as shown in FIG. 17, the angle of incidence of the recording light 128' is slightly inclined so that a green light spot to be regenerated is adjacent to the previously recorded red light spot. Then, this process is repeated with a blue laser beam. Likewise, the angle of incidence of the recording light is slightly inclined so that a blue light spot is adjacent to the previously recorded red light spot group and green light spot group. For the hologram 121 thus formed, respective colors are independently regenerated by irradiating tricolor light of red, green, and blue at the regenerative-light optical path 130 of the same optical path as the reference light 129, and the respective colors are diffracted at respective different angles and are space-separated. Clear tricolor light spot groups which are arrayed in a mosaic manner are formed on a single plane and yet are transparent in external appearance.

(Embodiment-B2)

FIG. 18 is a birds-eye view of the multi-recorded hologram and the image formation surface in this embodiment. The entire construction is the same as FIG. 12 shown in the embodiment-B1. The basic pattern is a dot pattern such as the one shown in FIG. 19, and the basic patterns are shifted at intervals of one pitch so that they are overlapped with one another and recorded with red, green, and blue light. In the interior of the hologram, the three patterns are recorded as shown in FIG. 18, in the form such that they share the space in the medium with one another.

For each pattern, the color dot patterns are regenerated independent of each other only by light of the color used when recording and light having a wavelength in the vicinity of the color, and a tricolor light spot group is formed on an image formation surface, as shown in FIG. 20. In FIG. 21, 122 is a transparent substrate, 125 a hologram recording material, 126 a protective film of the hologram recording material, 133 a glass block, 134 an index matching solvent, 135 a pattern mask, 128 recording light, and 129 reference light. It is desirable that the index matching solvent 134 be sandwiched between the protective film 126 and the glass block 133. The pattern mask 135 on which dot patterns to be recorded are formed is fixed in the proximity of the transparent substrate 122 and is illuminated by the recording light 128 which is, for example, red laser light. At the same time as this, the reference light 129 is incident from the side of the glass block 133, and the light intensity pattern caused by the interference with the recording light is recorded on the hologram recording material 125 as a refractive index profile. For the mask pattern 135 used in this embodiment, the basic pattern shown in FIG. 19, for example, is formed by boring holes in a thin metal plate, or a coated metal film is patterned on a glass substrate by photolithography. Then, the pattern mask 135 is shifted by one dot and is fixed, and pattern recording is likewise performed with green laser light. Furthermore, this process is repeated with blue laser light. In addition to the recording method shown in this embodiment, of course a multi-step method which is generally used as holography can also be used. For the hologram 121' thus formed, the glass block is removed and then respective colors are independently regenerated by irradiating tricolor light of red, green, and blue into the transparent substrate 122 at the regenerative-light optical path 130 opposed to the reference light 129. A clear tricolor light dot pattern is formed at a position where the pattern mask 135 is placed when recording, and yet is transparent in external appearance.

(Embodiment-B3)

In this embodiment, the light source 123, as shown in FIGS. 22 and 23, can switch red, green, and blue colors, or comprises a combination of a white light source and a tricolor filter and has a function of switching a color in a time series manner.

On the volume phase hologram 121, three element holograms which respectively diffract light beams of three colors in certain directions are multi-recorded so that they share the space in the medium with one another. The diffraction angles may be the same or different between the colors. Each element hologram is regenerated only by light of the color used when recording and light having a wavelength in the vicinity of the color, but it is not regenerated by light of a color different from that. The light of each color, emitted from the light source 123 and propagated through the transparent substrate 122, regenerates each element hologram independently, and this regenerated light is emitted from the transparent substrate surface at respective certain angles, and becomes uniform illumination light of each color. First, a light intensity pattern, caused by the interference between the recording light 128 which is, for example, red laser light and the reference light 129 of the same color, is recorded on the hologram recording material 125 as a refractive index profile. The reference light 129 is collimated light or nearly collimated light, and the regenerated light becomes the same collimated light or nearly collimated light. This process is subsequently repeated with green laser light and furthermore with blue laser light. The hologram 121 thus formed is independently regenerated with tricolor light of red, green, and blue, which is incident at the regenerative-light optical path 130 of the same optical path as the reference light 129. Now, light of each color is alternately incident to regenerate each element hologram by switching the color of the light source or the color filter, and consequently, there is obtained uniform illumination light of three colors which alternately switch in a time series manner. Note that, when each element hologram is regenerated at the same time with tricolor light without switching a color, white illumination light is obtained.

Figure 24:
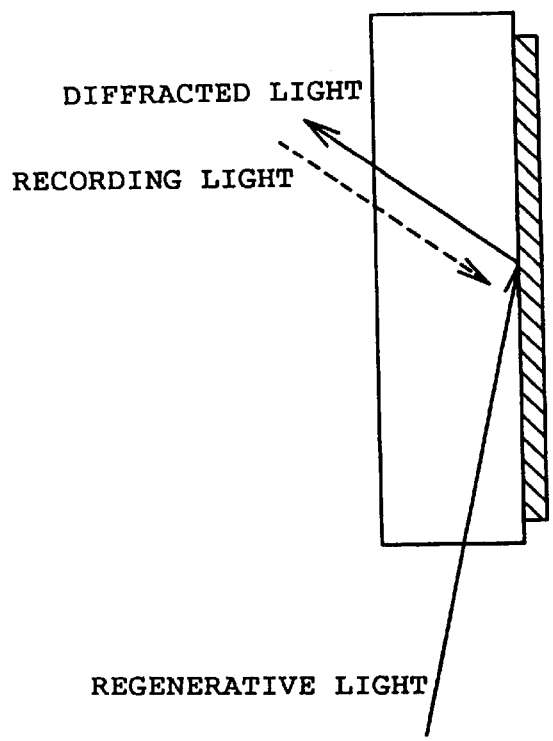
FIG. 24 shows an example of a structure used for enhancing the utilization efficiency of the diffracted light in the volume phase hologram.
Figure 25:
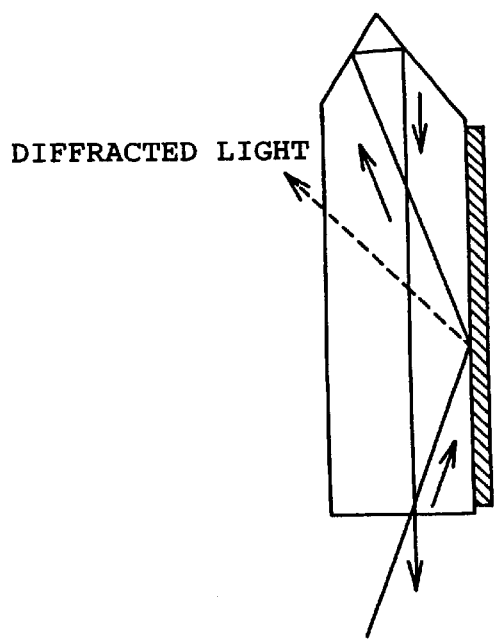
FIG. 25 shows an example of a structure used for enhancing the utilization efficiency of the diffracted light in the volume phase hologram.
Figure 26:
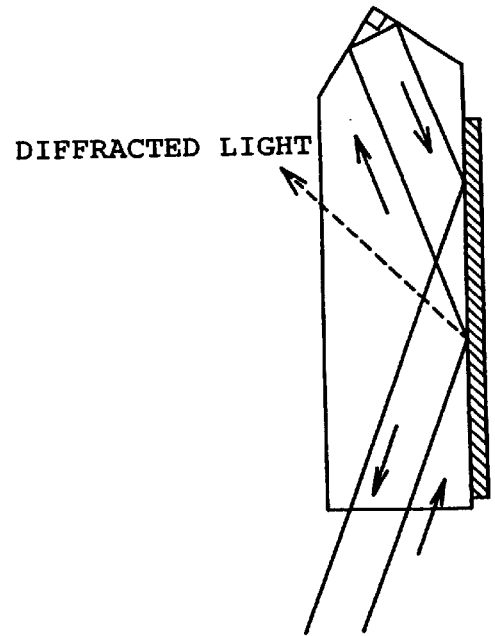
FIG. 26 shows an example of a structure used for enhancing the utilization efficiency of the diffracted light in the volume phase hologram.

In the aforementioned embodiments of B1 to B3, as shown in FIG. 24 a difference between the diffraction efficiencies in the polarization direction of the regenerative light is improved and high efficiency of light utilization can be realized, by selecting the angle between the regenerative-light optical path and the recording light so that it becomes greater than 90 degrees after the incidence of the recording light upon the transparent substrate. At the same time, the influence of the scattering of the diffracted light, which is caused by the fact that the wavelength of the regenerative light has a certain width, can be reduced, and a clear dot pattern having no dimness can be regenerated. Also, uniform illumination light with no discolored portion is obtained. This does not need to be considered in a case where a light source having a single wavelength and a uniform polarization direction, such as a laser, is used, but it becomes important when regeneration is performed with white light. In addition, the leakage of light from the surface can be eliminated by selecting the regenerative-light optical path so that the regenerative light being propagated can meet total-reflection requirements at the internal surface of the transparent substrate. Furthermore, as shown in FIGS. 25 and 26, if another end, which opposes the end on which the regenerative light is incident, is ground like a prism and the vertical angle is made so that the remaining regenerative light, diffracted by the hologram, is all reflected and returns back to the original optical path, then the leakage of light from the end face can be eliminated. For example, the reflected light may be returned to the light source side in parallel to the surface of the transparent substrate (FIG. 25), or the vertical angle may be made 90 degrees so that the reflected light is returned through the original path again to the light source side (FIG. 26).

In addition, while this embodiment has been described with reference to the reflection hologram, the same function can be realized also for a transmission hologram.

Next, a description will be made of embodiments of application of this invention to a HUD.

(Embodiment-B4)

Figure 27:
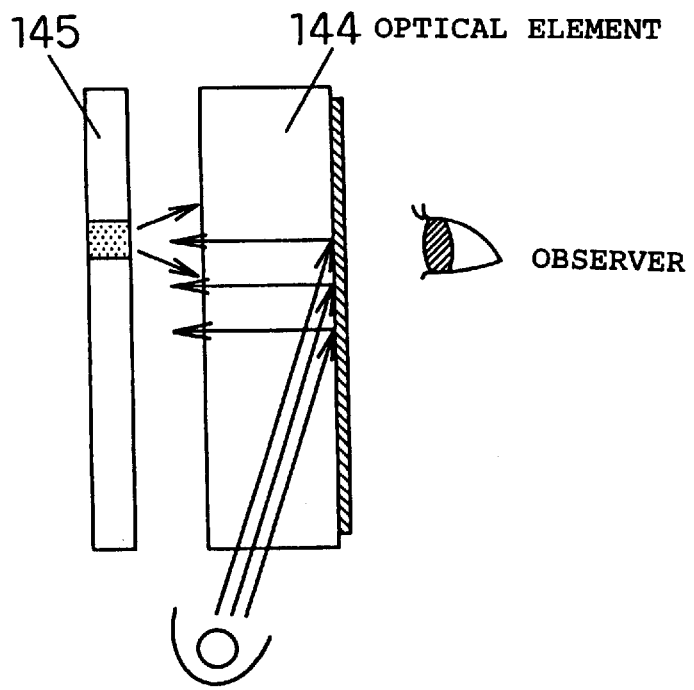
FIG. 27 shows a construction example of an image display device constructed by a combination of the reflection optical element of the present embodiment and a polymer dispersed liquid crystal display device using back scattering.

FIG. 27 is a schematic view of this embodiment, which is constructed by a combination of an optical element 144 forming the tricolor light spots of the aforementioned embodiment and a polymer dispersed liquid crystal display device 145. The optical element 144 in this embodiment is constructed with a reflection hologram. The polymer dispersed liquid crystal display device 145 displays an image, using the back scattering of the liquid crystal layer.

(Embodiment-B5)

Figure 28:
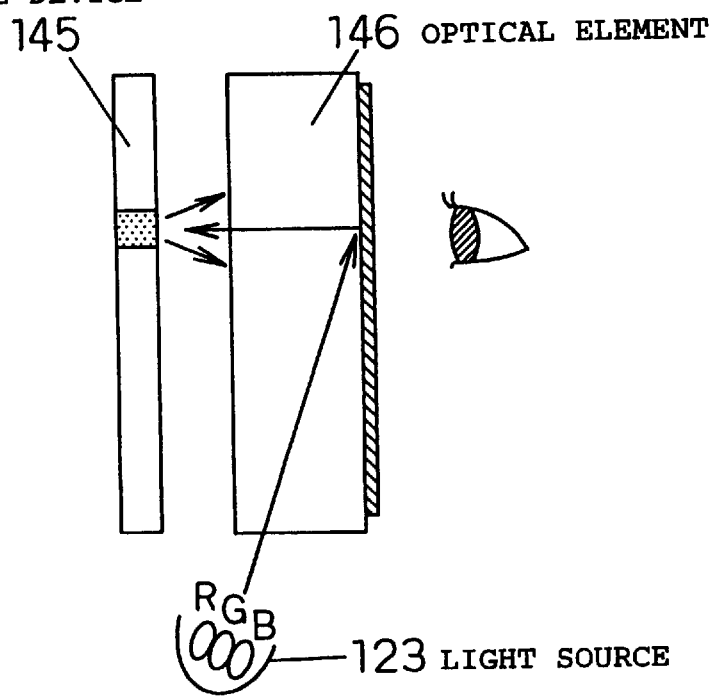
FIG. 28 shows a construction example of an image display device constructed by a combination of the reflection optical element of the present embodiment and a polymer dispersed liquid crystal display device using back scattering.

FIG. 28 is a schematic view of another embodiment of the present invention and is an example of the structure where an optical element 146 forming the illumination light of the aforementioned embodiment where a color is switched in a time series manner and a polymer dispersed liquid crystal display device 145 are combined. The optical element 146 in this embodiment is constructed with a reflection hologram. The polymer dispersed liquid crystal display device 145 displays an image, using the back scattering of the liquid crystal layer. Illumination light of three colors which switches in a time series manner is supplied by fixing the polymer dispersed liquid crystal display device 145 in the proximity of the optical element 146. For example, the switching is performed one time per 1/180 second, and the luminance signals corresponding to respective color images are displayed in synchronization with the aforementioned display device 145, whereby a continuous color image is recognized by the eyes. While in the aforementioned embodiment a single color image has been constructed with three pixels, in this embodiment the pixels of the polymer dispersed liquid crystal display device 145 can be all utilized in the image display and therefore the resolution is enhanced.

Any of the optical elements of this embodiment described above has been constructed by the reflection hologram, and any of the polymer dispersed liquid crystal display devices displays an image, using back scattering. However, a transmission hologram and a polymer dispersed liquid crystal display device displaying an image by use of forward scattering may be used, and the combination thereof can be arbitrarily selected according to the purpose.

(C)

Next, a description will be made of a device equipped with both image information display means and light irradiating means, i.e., a polymer dispersed liquid crystal given a hologram function.

A conventional polymer dispersed liquid crystal makes a display, making use of a light scattering phenomenon caused by both a high polymer and liquid crystal existing as a certain aggregate. In this case, the distribution state of the liquid crystal and the high polymer is, so to speak, random.

A large number of propositions have been made of the construction of the polymer dispersed liquid crystal layer and the fabrication method. It has been proposed, for example, in Published Unexamined Patent Application Nos. H1-142713, H1-225924, H2-99919, and H1-252689, that liquid crystal is capsuled with a high polymer medium, that liquid crystal is contained in a porous high polymer, that a high polymer and liquid crystal are emulsified and separated from each other, and that a monomer and a liquid crystal mixture are polymerized with light or heat and are separated from each other. These methods differ from each other, but liquid crystal is dispersed at random into a high polymer matrix, then light is scattered, and a slightly opaque image is obtained. If a voltage is applied to this, then liquid crystal will be regularly arranged and become transparent. When a reflection display device of a direct visual type is used, light from a suitable light source is irradiated to a scattered and slightly opaque image, and the reflected light will be observed. In such a case, the back scattering characteristic of the polymer dispersed liquid crystal layer must be great with respect to the irradiated light.

When a projection display device is used, an image is constructed by transparent pixels, but the forward scattering component of the polymer dispersed liquid crystal layer needs to be suppressed because the forward scattering light from some other scattered and slightly pixels reduces the contrast.

However, a conventional polymer dispersed liquid crystal layer such as described above makes a display, using the light scattering phenomenon caused by both a high polymer and liquid crystal existing as a certain aggregate, and in this case, the distribution state of the liquid crystal and the high polymer is, so to speak, random. Therefore, because at least 50% of illumination light passes through the polymer dispersed liquid crystal layer as forward scattering light, it is extremely difficult to enhance the ratio of the back scattering light which is obtained, and yet the ratio cannot exceed 50%.

On the other hand, in the liquid crystal display device of this embodiment, the distribution state of a high polymer and liquid crystal is controlled so that the back scattering or forward scattering in the display of the polymer dispersed liquid crystal is selectively enhanced overwhelmingly. That is, the liquid crystal display device of this embodiment is characterized in that liquid crystal and a high polymer are arrayed in the form of a lattice with a hologram fabricating technique and that light is incident from a fixed light source on the arrayed liquid crystal and light is, so to speak, modulated, whereby a scattering image is obtained. In addition, by selecting the angles of the object light and the reference light when fabricating a hologram, the angles of the incident light from a light source at the time of regeneration and the emitted light from a display can be related to a predetermined relationship. This can be made as the light irradiating means having an optical-path converting function of this embodiment.

Although the light regulating layer of the liquid crystal display device in this embodiment can be fabricated by some following methods, the characteristic features of this embodiment will be described from the point of the operating characteristics with respect to a liquid crystal display device obtained as an example by a photopolymerization method.

Figure 29:
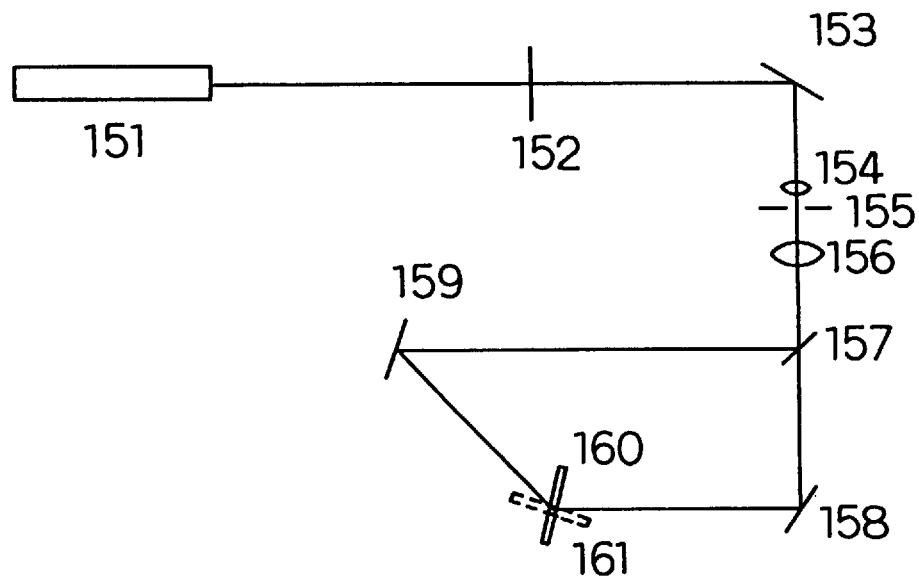
FIG. 29 shows an example of an exposure system for fabricating a liquid crystal display equipped with both image information display means and light irradiating means.
Figure 30:
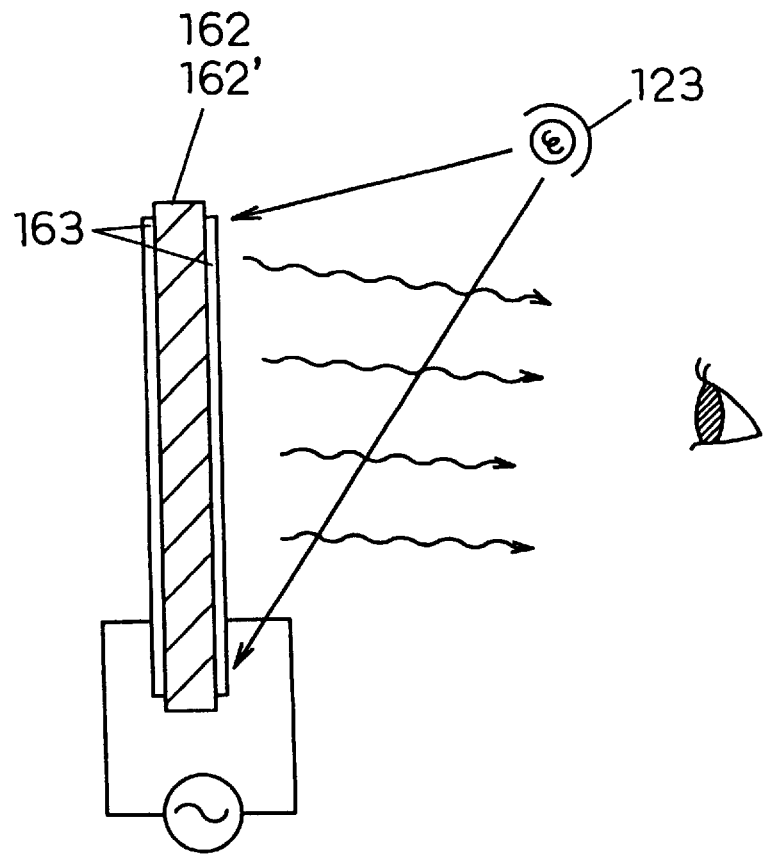
FIG. 30 shows an example of the operation of the HUD using the aforementioned liquid crystal display device.

A general fabrication method of the photopolymerization method is as follows:

A light regulating layer precursor is composed of the following main components. The main components are at least one kind of ethylene unsaturated compound and/or suitable oligomer which can be added and polymerized, a polymerization initiator, a chain moving agent, a light sensitizer, and at least one kind of nematic liquid crystal. This composite is sandwiched between two transparent substrates, and then light is irradiated, for example, by an exposure system shown in FIG. 29. In the figure, 151 is a coherent light source, for example, an argon laser ($\lambda$=514.5 nm), 152 a shutter, 153 a mirror, 158 a mirror or diffuse reflector, 159 a diffuse reflector, 154 an object lens, 155 a space filter, 156 a collimate lens, 157 a beam splitter, and 160 or 161 a sample. The angle of incident light can be arbitrarily set by adjusting 158 and 159 respectively. For a beam, a flat wave or spherical wave can be arbitrarily selected with a suitable lens system. After the setting of the incident angle, the shutter 152 is closed, then a sample is placed in a place of 160 or 161, and the shutter 152 is opened for exposure. A given energy was equivalent to about 300 to 1000 mJ/cm$^2$. After exposure, UV light is irradiated to the whole surface, and heat processing may be performed as needed. A liquid crystal thus made was taken out and was driven as shown in FIG. 30 (case of a reflection type). That is, regenerative light was irradiated from a light source 123, an a.c. voltage was applied to a panel 162 through electrodes 163, and an observation was made in one direction. As a result, there was recognized the phenomenon of the case where the panel becomes transparent and the case where light is strongly scattered back, depending upon the applied voltage. Although the present invention is not subjected to any limitations for the following guess, the aforementioned effect caused by the light regulating structure where the liquid crystal display of this embodiment is controlled can be considered in one idea as follows:

In a case where an image is regenerated by holography, the same light as object light will be emitted if light is irradiated in the same direction as reference light. Because, in this embodiment, light reflected at the diffuse reflector is used as object light, it is considered that a pattern caused by the interference between the object light and the reference light has been recorded in the light regulating layer. If light is incident in this light regulating layer from the same direction as the reference light, the light regulating layer will emit light, as if a diffuse reflector is just behind the liquid crystal display and light is being reflected from the reflector. Therefore, in the case of the diffraction efficiency being 100%, incident light gives the same effect as the effect that incident light is practically scattered nearly 100% backward. As described above, one of the significant features of this embodiment is that while a conventional polymer dispersed liquid crystal has simply scattered light equally due to the random structure and has displayed an image based on the scattering, a novel image display function of selectively scattering light backward has been realized by controlling the array of the high polymer and the liquid crystal layer. Of course, it is obvious that, in the case of a transmission type hologram, light is scattered forward. In addition, scattering light may be used in the reference light, and in this case, the degree of freedom is increased in the direction of the irradiation light at the time of regeneration. A reason considered concerning why the panel becomes transparent when a voltage is applied is because an orientation of liquid crystal is varied by a voltage and therefore a difference $\Delta n$ between a refractive index $n_1$ of a high polymer phase and a refractive index n2 of a liquid crystal phase has practically become zero.

The light regulating layer of the liquid crystal display of this embodiment can be made by using various kinds of methods.

As one of the methods, basically the photopolymerization method of a polymer dispersed liquid crystal is performed in the same way, coherent light is used as a light source of irradiation, and the method where the volume phase hologram is made is performed in the same way, as previously described. With this, the light regulating layer is made. Also, the light regulating layer can also be made by using so-called photosensitive resin, making interference fringes consisting of a resin layer and an air layer into the resin by performing development processing, and impregnating these fringes with liquid crystal. A case where an optical switch has been made with the latter method has been reported by Lawrence Domash et al ("Active Holographic Interconnects for Interfacing Volume Storage," SPIE, Vol. 1662, p 211 (1992)). An ethylene unsaturated monomer of liquid or low melting point, particularly acrylic or metacrylic ester can be used as a monomer suitable for making a light regulating layer by photopolymerization. These may be, for example, a multifunctional monomer such as trimethylol propane triacrylate, or an oligomer such as ethylene glycol acrylate or urethane acrylate. These may be used individually or can also be used in combination. Furthermore, other monomers such as styrene or carbazole may be used together as needed. These monomers and oligomers are not particularly specified, but one usually used for making a polymer dispersed liquid crystal can be used, or various kinds of monomers or oligomers well known to those having skill in this field, such as a photopolymerization composite for making a volume hologram such as that proposed in Published Unexamined Patent Application No. H2-3082, can be properly selected and used. In order to make a photopolymerization with coherent light, sensitizing dyes corresponding to the wavelength and an appropriate photopolymerization initiator are needed, and cyanine dyes, dyes such as cyclopentanone, diphenyl iodonium salt or a combination of this salt and dyes, various kinds of quinone, triphenylimidazole dimmer, and hydrogen donor can be suitably selected in combination and used. It is desirable that liquid crystal be one whose birefringence and dielectric anisotropy is large and whose elastic constant is small, and various kinds of liquid crystal already put on the market can be selected and used. For example, the following general equations are desirable.

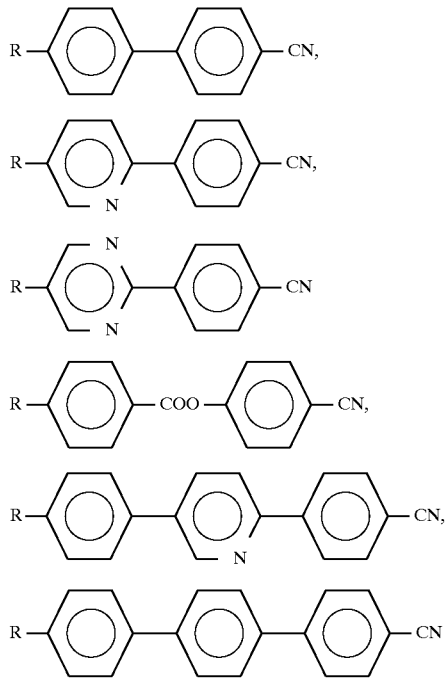

where R represents the alkyl or alkoxyl group where the number of carbons is 2 to 10. These can be mixed according to the purpose and used.

While the present invention will be described in detail with reference to embodiments, it is not limited to these embodiments.

(Embodiment-C1)

A mixture, which is composed of 10 parts of ethyl hexyl acrylate, 26 parts of trimethylol propane triacrylate, and 5 parts of urethane acrylate oligomer all as a monomer, 60 parts of the following composite as liquid crystal,

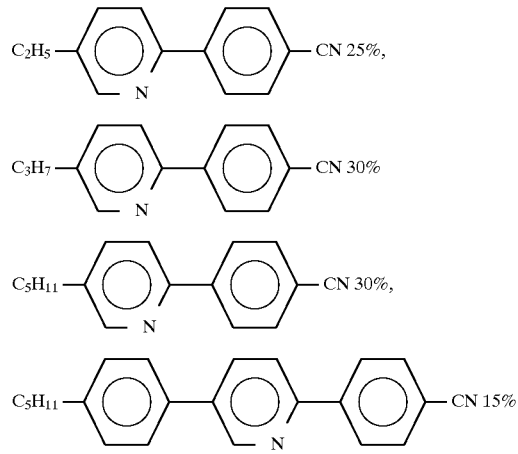

0.3 parts of 2-mercaptobenzoxazole, 0.25 parts of 2,2'-bis (o-chlorophenyl)-4,4',5,5'-tetraphenyl-1,1'-biimidazol, 0.05 parts of cyclopentanone-2,5-bis {(4-(diethylamino)-phenyl) methylene}, and a very small amount of 2,6-di-tert-butylphenol, was inserted between two ITO glass plates of 10 cm×10 cm. In the exposure system shown in FIG. 29, an argon laser (wavelength 514 nm, 100 mW) was used as a light source. An MgO plate was placed as a diffuse reflector at a position 1 cm away from a sample, and object light and reference light were incident perpendicular to the sample. With a reflection type, exposure was made for 15 seconds. Thereafter, the whole surface was exposed with UV light. The obtained liquid crystal exhibited a transmittance of about 77% with a threshold voltage of 35 V, and if white light was irradiated at the time of nonapplication of a voltage, green back scattering was seen.

(Embodiment-C2)

A liquid crystal panel was fabricated in the same way as the embodiment-C1, except that, as a monomer, ethyl hexyl acrylate is 8 parts of the whole, trimethylol propane triacrylate is 10 parts, urethane acrylate oligomer is 3 parts, and liquid crystal is 80 parts. The transmittance was 85% with a threshold voltage of 28 V, and if white light is irradiated at the time of nonapplication of a voltage, green back scattering was seen.

(Embodiment-C3)

A liquid crystal panel was fabricated in the same way as the embodiment-C2, except that as a monomer, the mixed ratio of ethyl hexyl acrylate and trimethylol propane triacrylate is 3 parts and 15 parts. The transmittance was 85% with a threshold voltage of 30 V, and green back scattering was seen at the time of nonapplication of a voltage and with white light irradiation.

(Embodiment-C4)

A liquid crystal panel was fabricated in the same way as the embodiment-C1, except that, as a monomer, ethyl hexyl acrylate is 3 parts, trimethylol propane triacrylate is 21 parts, urethane acrylate is 6 parts, and liquid crystal is 70 parts. The transmittance was 87% with a threshold voltage of 40 V, and if white light is irradiated at the time of nonapplication of a voltage, green back scattering was seen.

(Embodiment-C5)

A liquid crystal panel was fabricated in the same way as the embodiment-C1, except that the MgO plate adheres closely to the sample and the reference light is also used for the object light and irradiated without using the object light. The transmittance was 75% with a threshold voltage of 33 V, and extremely strong green back scattering was seen at the time of nonapplication of a voltage and with white light irradiation.

(Embodiment-C6)

In the embodiment-C1, if the light source is replaced with red (Krypton laser, λ=647 nm) and blue (Argon laser, λ=458 nm), regenerative scattering light can be made red and blue. With the same conditions as the embodiment-C1, a mask pattern with fine holes, such as that shown in FIG. 19, is placed on the surface of the ITO glass plate on the object light side. First, exposure is performed with green laser light, and then the mask is shifted by one pitch and exposure is performed with a red laser. Furthermore, the mask is shifted and exposure is performed with a blue laser. UV whole-surface exposure processing is performed in the sample thus exposed in sequence to the whole surface of the panel. It is considered that the regenerative pattern will become such a pattern as shown in FIG. 20. The white strong scattering reflection light was obtained with white light irradiation to the obtained panel.

(Embodiment-C7)

Figure 32:
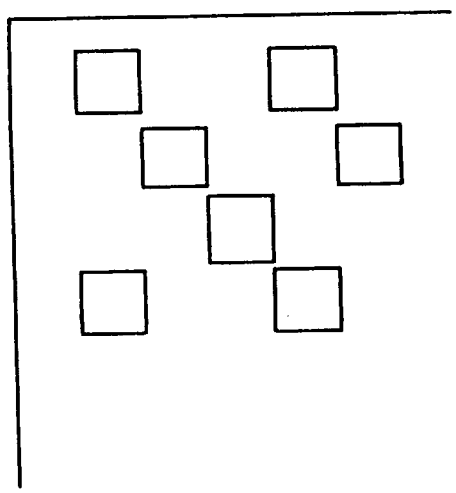
FIG. 32 shows a square-hole pattern for coloration.

A panel was made in the same way as the embodiment-C6, except that the mask pattern of the embodiment-C6 is formed into a square hole (1-cm square, for example) as shown in FIG. 32. When white light was irradiated to the obtained panel, there was recognized color scattering light where red, blue, and green are independently obtained at every pattern.

The aforementioned hologram is not limited to these embodiments, but a display of color by various patterns is possible by using an arbitrary pattern mask.

(Embodiment-C8)

A panel was made in the same way as the embodiment-C7, except that reference light is incident from the end face of the substrate at an angle near 90 degrees relative to the surface direction. When regenerative white light was incident upon the obtained panel in the same direction as the reference light, i.e., from the panel substrate end face, the same scattering light as the embodiment-C7 was obtained.

While the aforementioned embodiments have been described with reference to the reflection hologram, of course the transmission hologram is also possible, and it is obvious in this case that strong forward scattering is selectively obtained. In addition, in the case of polychromatic printing, it is also obvious that a plurality of lasers are irradiated to the sample at the same time so that superimposed printing can be made.

As described above, a device equipped with both image information display means and light irradiating means becomes possible according to this embodiment, and the HUD of this embodiment can be made as a more compact form. In addition, the scattering selectivity of the HUD is enhanced also as a polymer dispersed liquid crystal, so a brighter image is obtained at a wide visual field angle.

(D)

While the structure of the polymer dispersed liquid crystal has been controlled so that scattering can be selectively performed and the light utilization efficiency could be improved, the scattering efficiency was lower than one predicted at the beginning. For example, in the polymer dispersed liquid crystal of the back scattering mode, it was found that slight forward scattering was still included. This is considered to be because the self-interference of the scattered laser light takes place when fabricating the hologram and, as a result, unnecessary noise grating is printed.

Figure 33:
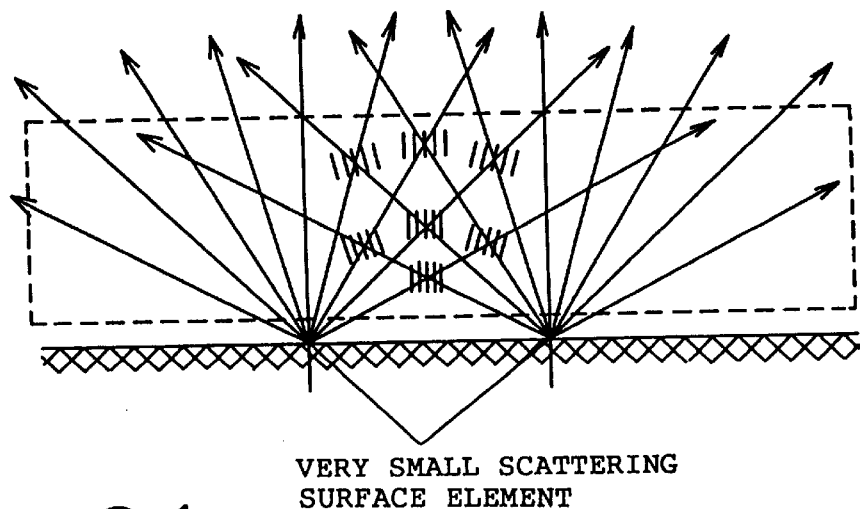
FIG. 33 shows a model diagram of an occurrence and suppression of a noise grating.
Figure 34:
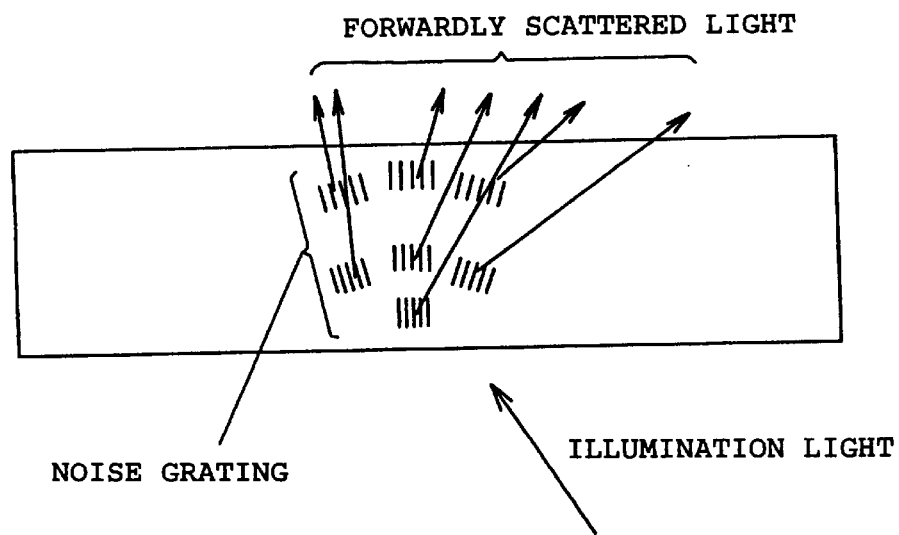
FIG. 34 shows a model diagram of an occurrence and suppression of a noise grating.

When laser light is irradiated on a diffusing surface at the time of hologram fabrication to try to obtain scattering light, a mutual self-interference such as that shown in FIG. 33 will take place. In the figure, two very small areas adjacent to the diffusing surface are schematically shown. The scattering light from each very small scattering surface element is emitted from the diffusing surface and then meets the scattering light from another very small scattering surface element, and forms interference fringes at that position. Now, if a light regulating layer precursor composed of the liquid crystal phase and the high-polymer phase of this embodiment is put at the position shown by a broken line of FIG. 33, the aforementioned interference fringes will be recorded as a refractive index profile. This is referred to as a noise grating. If illumination light is irradiated to the aforementioned hologram on which the noise gratings are recorded or the aforementioned light regulating layer, as shown in FIG. 34, light is randomly scattered due to each grating. Because the direction is oriented on the side opposite to the incident side of the illumination light, this becomes forward scattering light. In FIG. 34, it is assumed that light is incident from one direction as illumination light, but in a case where natural light or scattering illumination light such as a general room illumination is incident, more random forward scattering light will occur and this will cause a reduction in the picture quality of the liquid crystal display.

It has been found that an occurrence of this noise grating can be suppressed by making hologram patterns with certain improved special scattering-light.

Figure 35:
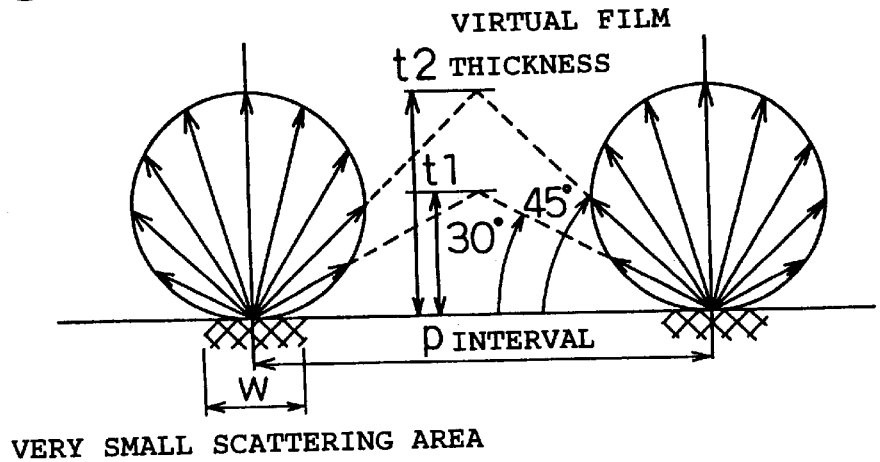
FIG. 35 shows a model diagram of an occurrence and suppression of a noise grating.

With FIG. 35, the noise-grating suppressing operation will be described with a special scattering-plate of this embodiment taken as an example. It is assumed that two very small scattering areas of the special scattering-plate each have a size of "w" and are arranged at a certain interval of "p". The horizontal line in the central portion in the figure represents the film thickness of a volume hologram, which is supposed to be disposed in contact with the special scattering-plate. From the geometrical relationship between the film thickness and the scattering light beam from each very small scattering area, symmetrical scattering light beams from both the very small scattering areas make an angle of 30 degrees measured from the scattering surface with respect to a film thickness t1, while the symmetrical scattering light beams become 45 degrees with respect to a film thickness t2. Interference occurs between the scattering light beams included in these scattering angles. However, assuming perfect diffusing light, a quantity of light included in these scattering angles is ¹⁄₁₆ for 30 degrees and only ¼ even for 45 degrees. Most light beams other than this portion do not cross each other within the volume hologram and do not contribute to formation of a noise grating. By introducing reference light, a hologram will be independently formed between this main scattering light and reference light.

(Embodiment-D1)

Figure 36:
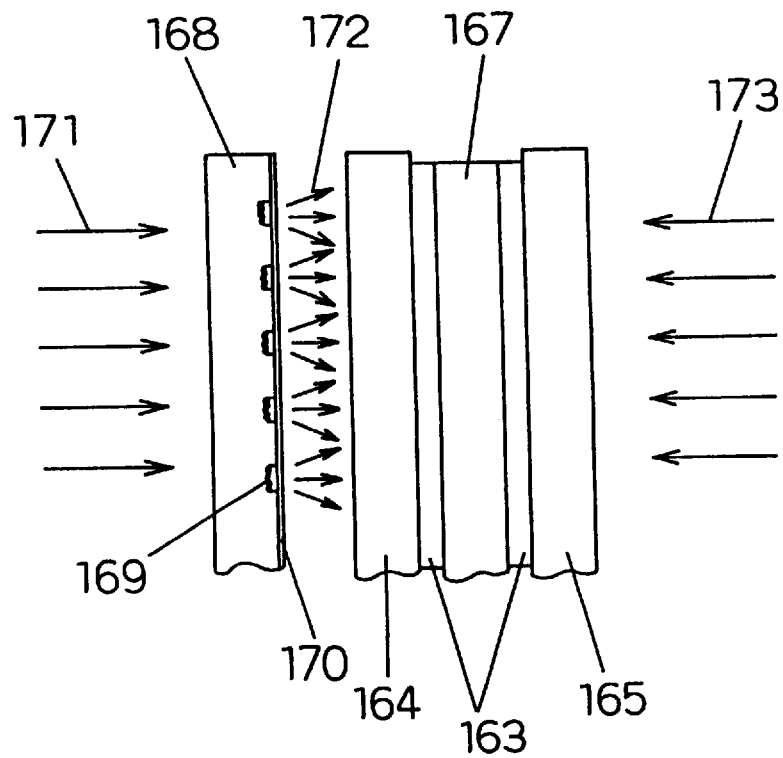
FIG. 36 is a diagram for explaining a method of fabricating a polymer dispersed liquid crystal layer by the use of a special scattering plate or a pin hole array.

The structure control of the polymer dispersed liquid crystal layer of this embodiment is realized with a fabricating method described hereinafter. FIG. 36 is an example of an optical system for fabricating the polymer dispersed liquid crystal layer 162' (FIG. 30) of this embodiment. A light regulating layer precursor 167 is interposed between the surfaces of transparent substrates 164 and 165 on which transparent electrodes 163 are formed. The transparent substrates both were glass plates of thickness 1.1 mm, the transparent electrodes both were patterned ITO films, and the thickness of the light regulating layer precursor was about 3 micron. 168 is a special scattering-plate, very small scattering areas 169 are formed on the glass plate in a mosaic manner, and a reflecting film 170 is formed on the remaining flat portion. The size of the very small scattering areas is about 50 micron and the interval is about 0.5 mm. This is formed by coating a photoresist on an aluminum deposited glass plate, giving the aforementioned mosaic pattern to the coated plate by photolithography, removing the aluminum film from the resist removed portion by etching, and furthermore giving sand blasting to the exposed glass surface of the etched portion. If argon ion laser light 171 of linear polarization is irradiated with a wavelength of 458 nm to this special scattering-plate 168, light passing through the very small scattering area 169 will be randomly scattered and object light 172 where this small scattered light beams are arranged in the form of a mosaic will be obtained. Because the laser light 171 incident upon the area other than the very small scattering areas 169 is reflected by the reflecting film 170, the laser light will not be contained in the object light 172. This object light is incident from the side of the transparent substrate .164, while reference light 173 of the same laser light is incident from the side of the transparent substrate 165. Laser light irradiation of about 50 mJ/cm$^2$ is performed, and at the time the aforementioned polymerization process has been advanced, the irradiation of the laser light is stopped. Then, uniform ultraviolet light is irradiated to the light regulating layer precursor 167, the entire is sufficiently polymerized, and the process is completed.

It was found that the polymer dispersed liquid crystal layer, fabricated in a method such as this, reflected and scattered illumination light of nearly 458 nm at efficiency exceeding 90% and could be observed in a wide angle range. A clear boundary was not seen between the areas where the very small scattering areas was placed when fabricating and the remaining area, and scattering light was observed over nearly the entire surface. The pixel to which a voltage of about 30 V was applied became transparent.

Figure 37:
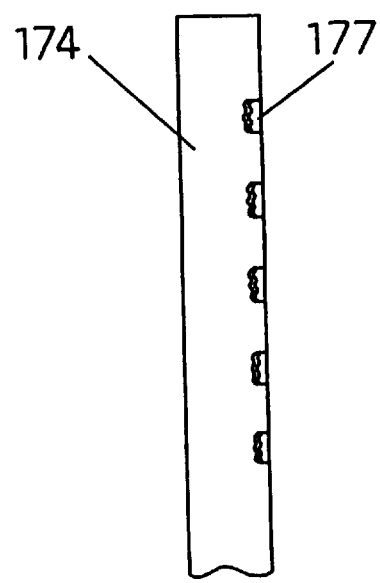
FIG. 37 is a diagram for explaining a method of fabricating a polymer dispersed liquid crystal layer by the use of a special scattering plate or a pin hole array.

While in this embodiment the special scattering-plate, provided with very small scattering areas of transmission types at part of the reflecting surface thereof, has been used, a special scattering-plate 174 where a reflecting film is provided only on a very small scattering area, shown in FIG. 37, may be used and laser light may be reflected at this surface. In addition, it is also possible to use a special scattering-plate whose entire surface is a transmission type or a reflection type.

Also, while in this embodiment the hologram pattern has been formed with the special scattering-plate closely contacted, the object light may be formed by forming an image of a scattering surface by the use of lenses or by a two-step exposure method. In addition, while in this embodiment the reference light has been collimated light, a uniform and wide visual angle can be realized by using the scattering light produced by a uniform scattering surface or the special scattering-plate of this embodiment as reference light. Furthermore, the object light may be formed by a pin hole array or a combination of a pin hole array and a scattering plate instead of the special scattering-plate.

(Embodiment-D2)

Figure 38:
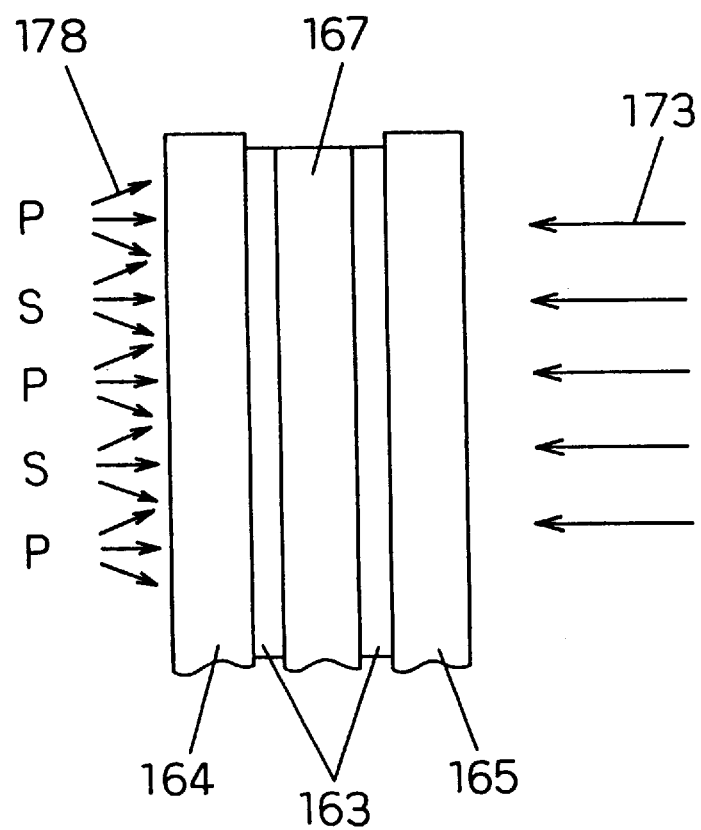
FIG. 38 is a diagram for explaining a method of fabricating a polymer dispersed liquid crystal layer by the use of a special scattering plate or a pin hole array.

This embodiment is the same as the embodiment-D1, except that the structure of the polymer dispersed liquid crystal layer differs. In the structure of this polymer dispersed liquid crystal layer, the distribution state of the liquid crystal phase and the high-polymer phase is controlled as a reflection hologram pattern, and this structure control is realized by a fabricating method described hereinafter. That is, as shown in FIG. 38, scattering light in the relationship where a P-wave and a S-wave are adjacent to each other as reference light is used to fabricate a hologram between the scattering light and the object light. The scattering light of these P-wave and S-wave adjacent to each other can be easily obtained by dividing a single laser beam into a S-wave and a P-wave by a ½ wavelength plate, passing these waves through masks (a) and (b) whose positions are complemented with each other, such as that shown for example in FIG. 39, to synthesize them as shown in (c), and passing the synthesized wave through a scattering plate.

In FIG. 38, the light regulating layer precursor 167 is interposed between the surfaces of the transparent substrates 164 and 165 on which the transparent electrodes 163 are formed. The thickness of the glass plates of the transparent substrates were both 1.1 mm, the transparent electrodes both were patterned ITO films, and the thickness of the light regulating layer precursor was about 3 micron. The size of the mask transmission pattern is about 50 micron and the interval is about 1.0 mm. Argon ion laser light of wavelength 458 nm was used as laser light. The object light 178 is caused to be incident from the side of the transparent substrate 164, while the reference light 173 is caused to be incident from the side of the transparent substrate 165. The object light and the reference light cause an interference pattern, and in the light regulating layer precursor 167, photopolymerization is started at the portion whose interference light intensity is high and then a high-polymer phase of a three-dimensional structure is formed. Laser light irradiation of about 30 mJ/cm$^2$ is performed, and at the time the aforementioned polymerization process has been sufficiently advanced, the irradiation of the laser light is stopped. Then, uniform ultraviolet light is irradiated to the light regulating layer precursor 167, the entire is sufficiently polymerized, and the process is completed.

It was found that the fabricated polymer dispersed liquid crystal layer reflected and scattered illumination light of nearly 458 nm at efficiency exceeding 90% and that it had a uniform wide visual angle in vertical and lateral directions. The pixel to which a voltage of about 30 V was applied became transparent.

(Embodiment-D3)

Figure 40:
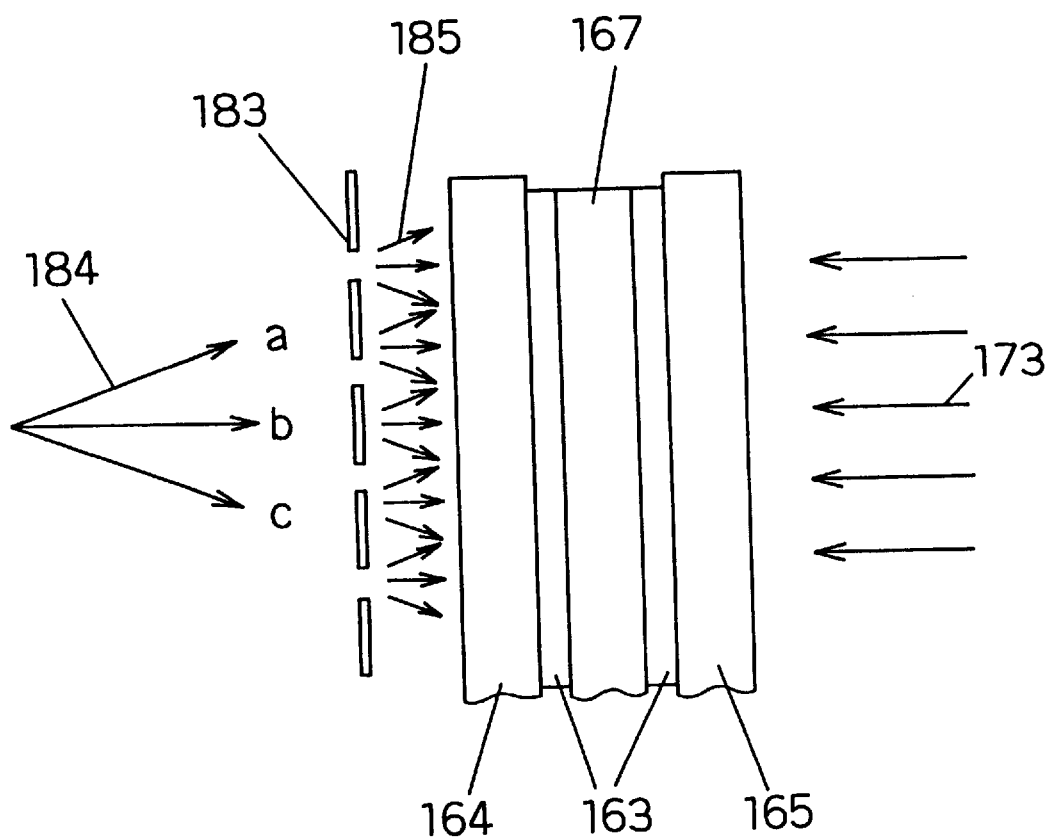
FIG. 40 is a diagram for explaining a method of fabricating a polymer dispersed liquid crystal layer by the use of a special scattering plate or a pin hole array.

FIG. 40 shows part of a n optical system for fabricating a polymer dispersed liquid crystal layer of a liquid crystal display device of this embodiment. In this embodiment, the angle of laser light 184 which is incident upon a pin hole array 183 is varied in a time series manner as shown in (a), (b), and (c) of FIG. 40, and then weak hologram patterns are formed with the object light 185 passed through the pin hole array at the set angles and reference light 173. In FIG. 40, three directions of (a), (b), and (c) have been shown for the sake of convenience. In practice, these weak hologram patterns are multiplexed in the light regulating layer precursor 167 with respect to all desired directions covering the angle of view of the display device, whereby scattering light with respect to illumination light is regenerated. According to this method, coherence can be eliminated in point of time. Therefore, hologram patterns are formed without interfering to each other and formation of noise gratings is suppressed.

While, in this embodiment, the pin hole array which is a fine pattern has been fixed and the angle of the laser light which is incident upon this array has been varied, a similar result would be obtained, even if laser light which is scattering light were incident upon the pin hole array and the position of the pin hole array were scanned. In correspondence with this, it is desirable that incident reference light have at least enough size to cover the fine pattern, and incident reference light is scanned in synchronization with object light.

(Embodiment-D4)

Figure 31:
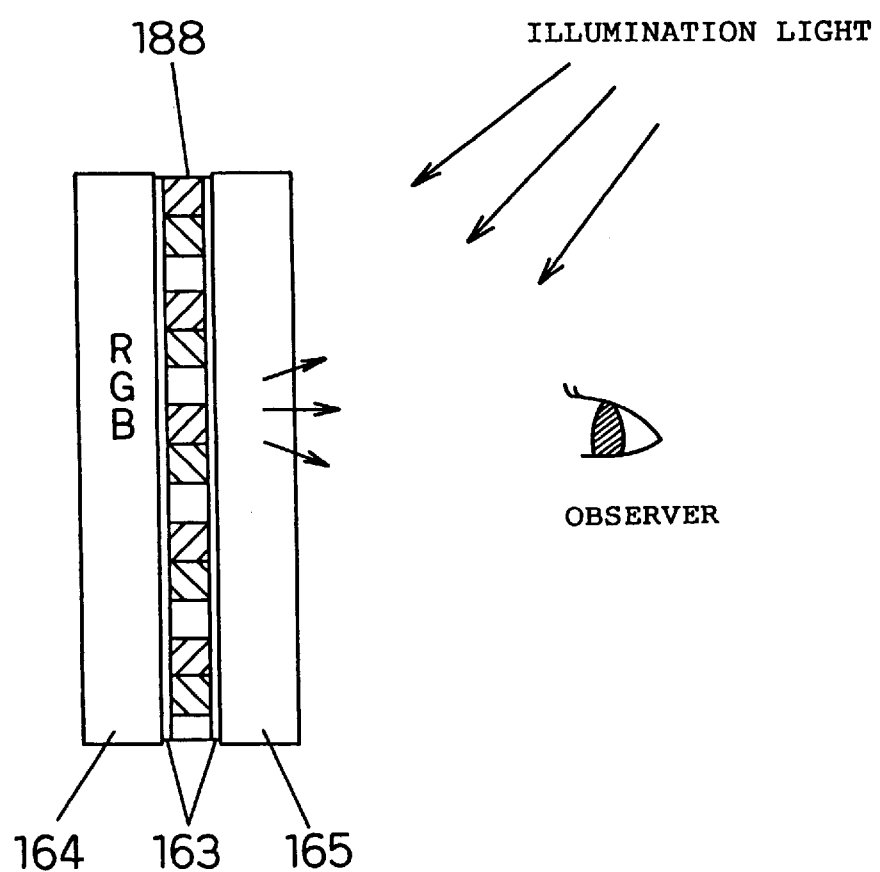
FIG. 31 shows an example of the operation of the HUD using the aforementioned liquid crystal display device.

FIG. 31 shows a liquid crystal display device in this embodiment. This embodiment is the same as the embodiment-D1, except that the structure of a polymer dispersed liquid crystal layer 188 differs. For this polymer dispersed liquid crystal layer 188, initially a hologram pattern is made by laser light of wavelength 458 nm, using a mask having a pattern such as that shown in FIG. 19. Then, the mask is shifted by one pitch and a hologram pattern is made by laser light of wavelength 514 nm. Finally, the mask is further shifted by one pitch and a hologram pattern is made by laser light of wavelength 648 nm. In this way, the layer 188 is formed. Each pattern is aligned with the position of a transparent electrode constituting a pixel, and pixels of "R,""G," and "B" are arrayed in the form of a mosaic, as shown in FIG. 31. The polymer dispersed liquid crystal layer 188 constructed in this way is seen as a white scattering surface, judging from the appearance. However, if a voltage is applied to each pixel so that the transmittance is varied, three colors of red, green, and blue will be observed. With this, it was found that a color image could be constituted.

(E)

In a case where a volume phase hologram in this embodiment is used as a light irradiating means, various usable modes become possible depending upon the direction of light diffracted by the hologram. A description will hereinafter be made of some examples.

(Embodiment-E1)

Figure 41:
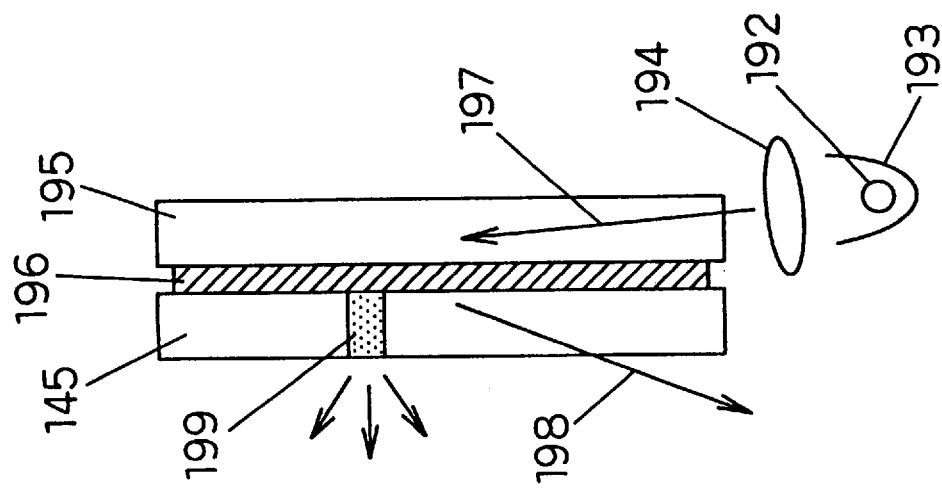
FIG. 41 is a principle diagram for explaining the function of an improved volume phase edge-lit hologram in the present embodiment.

FIG. 41 is a diagram of a HUD constructed according to this embodiment. The HUD is constituted by a combination of a polymer dispersed liquid crystal display device 145, a cold cathode fluorescent tube 192, a reflecting mirror 193, a cylindrical lens 194, a transparent substrate 195, and a hologram 196.

Figure 42:
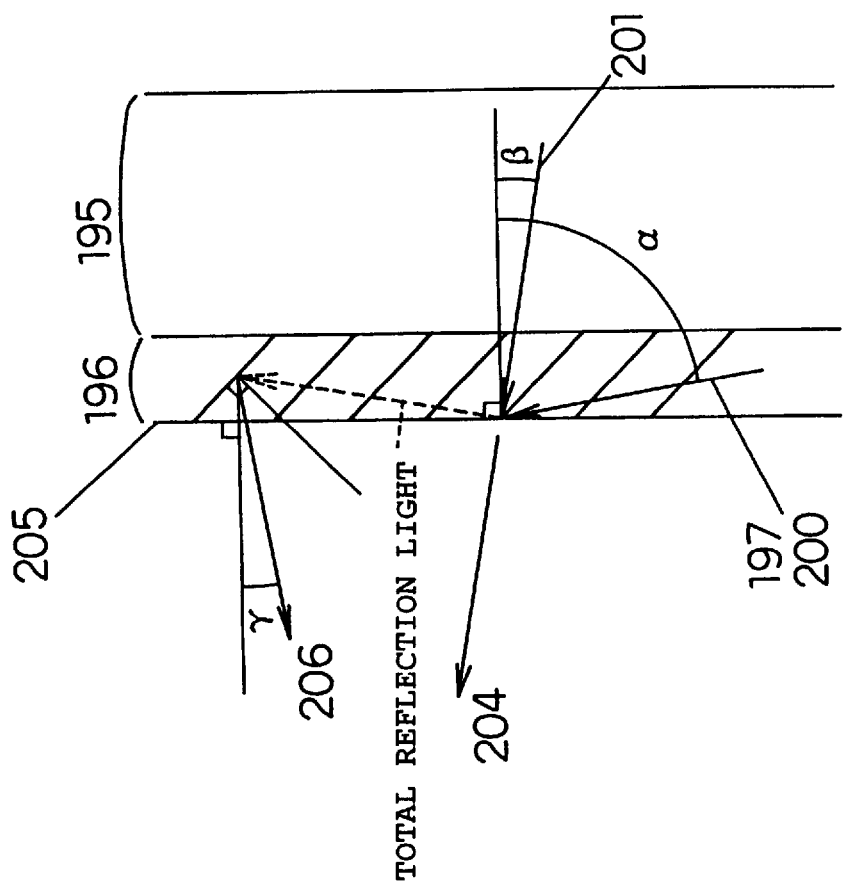
FIG. 42 is a principle diagram for explaining the function of an improved volume phase edge-lit hologram in the present embodiment.

This polymer dispersed liquid crystal display device 145 displays an image with the forward scattering of the liquid crystal layer. The light emitted from the cold cathode fluorescent tube 192 is focused once by the reflecting mirror 193, is converted into collimated white illumination light 197 by the cylindrical lens 194, and is incident on the transparent substrate 195. This collimated light becomes diffracted illumination light 198 which is emitted from the surface by the hologram 196, and illuminates the polymer dispersed liquid crystal display device 145. The hologram 196 is a so-called edge-lit hologram of the volume phase type constructed so that only light incident on the edge surface of the transparent substrate 195 can be emitted to the outside of the substrate. The hologram 196 is transparent in appearance, because no diffracted illumination light 198 is formed due to the diffraction of the light incident on the surface of the transparent substrate 195. Therefore, if the polymer dispersed liquid crystal display device is set to the transparent state, the entire image display portion of the display device will become transparent, and the background can be viewed like a scene seen through a glass. In addition, because the hologram is constructed such that the diffracted illumination light 198 is emitted from the surface in the down direction, there is no possibility that unnecessary illumination light passing through the transparent area of the polymer dispersed liquid crystal display device enters directly into the eyes of an observer. Therefore, since only the pixel 199 in the scattering state is brightly seen to the observer, an image superimposed with the background, whose contrast is high, is displayed. The hologram of this embodiment is constructed so as to meet the following Equations:

$$n \sin |\alpha| > 1 \quad \text{(Eq. 1)}$$

$$n \sin |\beta| < 1 \quad \text{(Eq. 2)}$$

$$n \sin |2\alpha + \beta - \pi| > 1 \quad \text{(Eq. 3)}$$

where n is the refractive index of the hologram medium, $\alpha$ and $\beta$ are the incident angle of the reference light and the incident angle of the object light, defined in the hologram medium, and $\pi$ is the ratio of the circumference of a circle to its diameter. Equations 1 and 2 represent the condition where light is incident on the end surface of the hologram substrate and becomes illumination light that is emitted from the hologram surface. Also, Equation 3 represents the condition for assuring the monochromaticity of the illumination light. FIG. 42 shows that reference light 200, incident from the end surface of a transparent substrate 195, interfere within the hologram medium with object light 201 and that a hologram 196 of a cycle structure is formed. If the white illumination light 197 is incident at the same angle as the incident angle of the reference light 200 and is regenerated, then second diffracted light 206 will coexist because incident light other than target diffracted light 204 will be all reflected at the hologram surface. In order to prevent this, the angle of emission v of the second diffracted light 206, $2\alpha+\beta-\pi$, can be made so as to meet a total-reflection condition such as that shown in Equation 3.

(Embodiment-E2)

Figure 43:
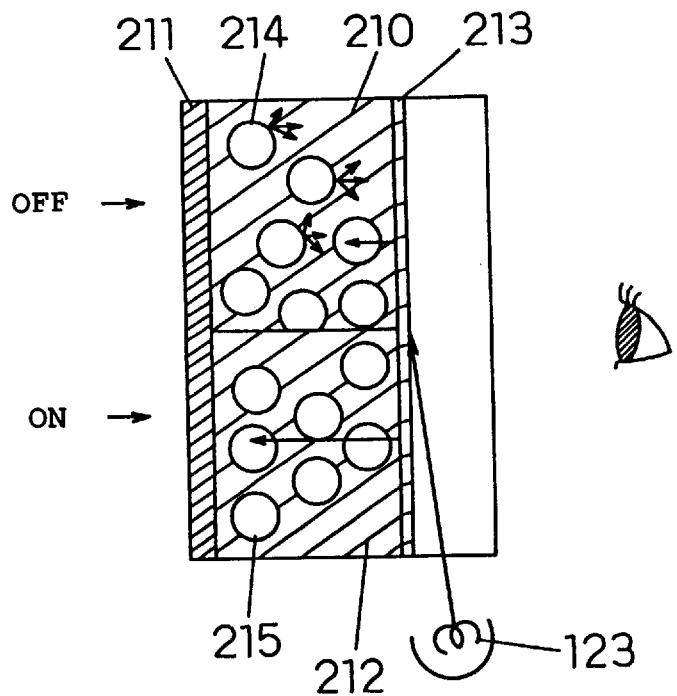
FIG. 43 is a conceptional diagram of a head up display of polymer dispersed liquid crystal using dichroic dyes in the present embodiment.

This embodiment is used as the reflection type where dichroic dyes are contained in polymer dispersed liquid crystal. FIG. 43 shows a part schematic view of the structure of this embodiment (transparent electrode and glass substrate not shown). The light emitted from a light source 123 is diffracted by a hologram 213 and gets into the liquid crystal panel portion. In an ON portion 212 (transparent), a liquid crystal layer 215 containing dichroic dyes is oriented and transparent, and the incident light is absorbed by a back absorbing plate 211 and does not return. On the other hand, for the light that got into an OFF portion 210 (scattering), light with a certain wavelength is absorbed and the remaining light is scattered and dyed, by the dyes in liquid crystal 214 of non-orientation. If a volume phase hologram is used for the hologram, light with a particular wavelength can be selectively diffracted. If the intensity of a light source becomes stronger, a brighter image can be obtained. For example, if a blue dye (dye absorbing light other than a blue color) is used and diffracted light of blue color is selected, the light will be scattered without being absorbed in the OFF portion. Because the hologram is transparent when viewed from the scattering side, a bright blue image is displayed on a black ground. Even if external light were superimposed on this and the absorption of the dyes were slightly incomplete, an image whose contrast is sufficiently strong would be obtained by diffracted light. If the HUD of this embodiment is used in the sunvisor of an automobile, it will be useful.

(Embodiment-E3)

Figure 44:
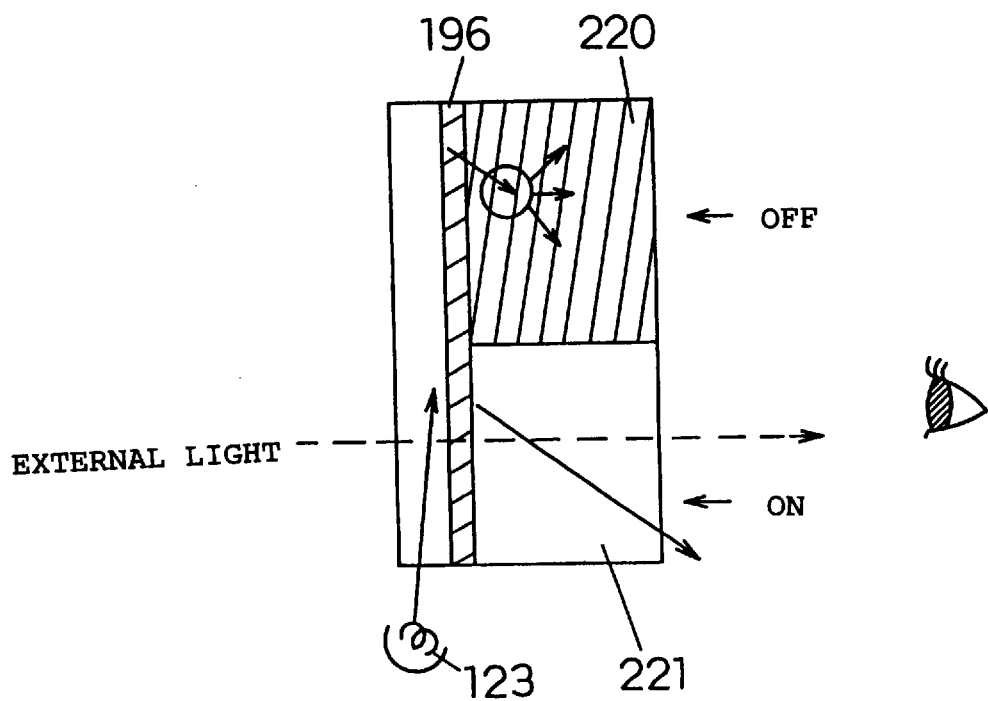
FIG. 44 is a conceptional diagram of a head up display of polymer dispersed liquid crystal using dichroic dyes in the present embodiment.

FIG. 44 shows a case where this embodiment is used as the transmission type where a dichroic dye is contained in polymer dispersed liquid crystal. The light emitted from a light source 123 is diffracted at a hologram 196 in an oblique direction. In a scattering portion 220 at an OFF state, a bright blue image is displayed because light is scattered at the image portion independently of the incidence direction of diffracted light. In an ON portion 221, blue diffracted light is obliquely incident on the image portion and does not get into the eyes. Therefore, only external light gets into the eyes and the ON portion is transparently seen. Even if external incident light (external light) got into, only the light of the OFF portion would be enhanced by the diffracted light. Therefore, an image whose contrast is high is obtained also with this case. It is obvious that other colors, for example, green, red, and yellow colors can be used.

In the following embodiments, a normal reflection liquid crystal panel is used as an image information display means. Although a normal reflection liquid crystal panel has a reflecting plate at the back thereof, an image does not become bright so much, because surrounding light is used as illumination light. When this is combined with light irradiating means using the hologram of this embodiment, a very bright image is obtained. If the HUD of this embodiment is used in the sunvisor of an automobile, it will be useful.

(Embodiment-E4)

Figure 45:
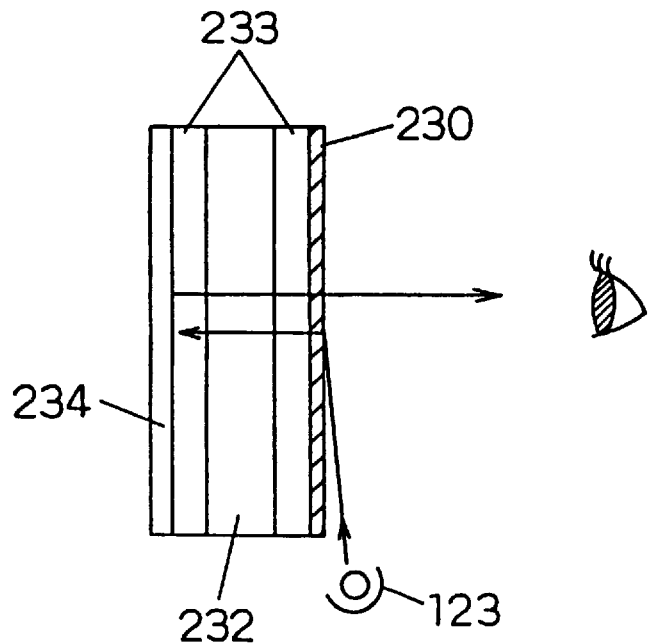
FIG. 45 is a diagram showing a head up display device using a reflection liquid crystal display of the present embodiment.
Figures 46A, 46B:
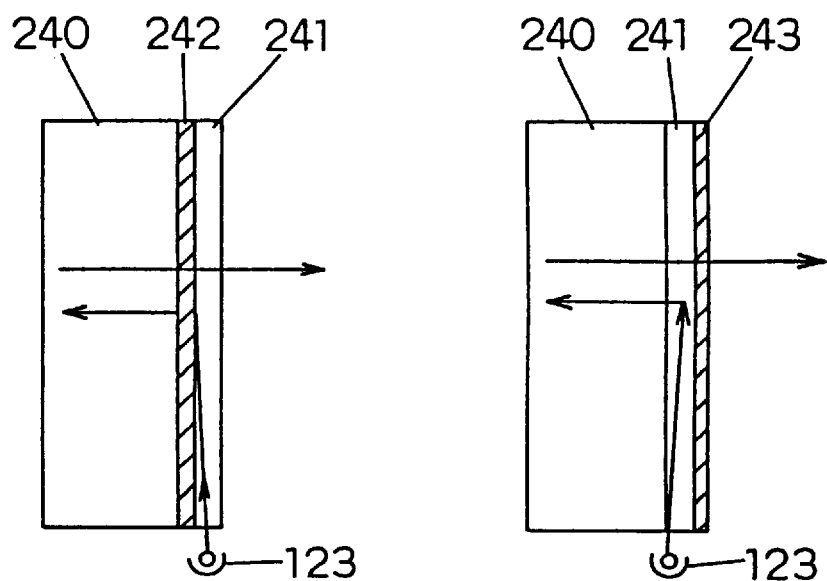
FIG. 46 is a diagram showing a head up display device using a reflection liquid crystal display of the present embodiment.

FIG. 45 shows a case where a transmission hologram has been placed at the front of a liquid crystal panel. In the figure, 230 is a transmission hologram, 123 a light source, 232 liquid crystal, 233 a glass plate provided with transparent electrodes or a filter, and 234 a reflecting plate. The incident light from the light source 123 is diffracted at the hologram and illuminates the liquid crystal from the front. The diffracted light is reflected at the reflecting plate 234 and a bright image is observed. In FIG. 46, a hologram previously made on a transparent substrate 241 is attached to a reflection liquid crystal panel 240. In FIG. 46(a) a transmission hologram 242 is shown, and in FIG. 46(b) a reflection hologram 243 is shown.

(Embodiment-E5)

Figure 47C:
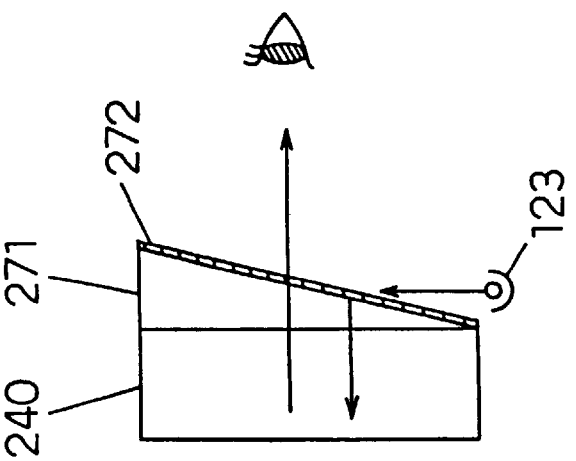
FIG. 47 is a diagram showing a head up display device using a reflection liquid crystal display of the present embodiment.
Figure 47B:
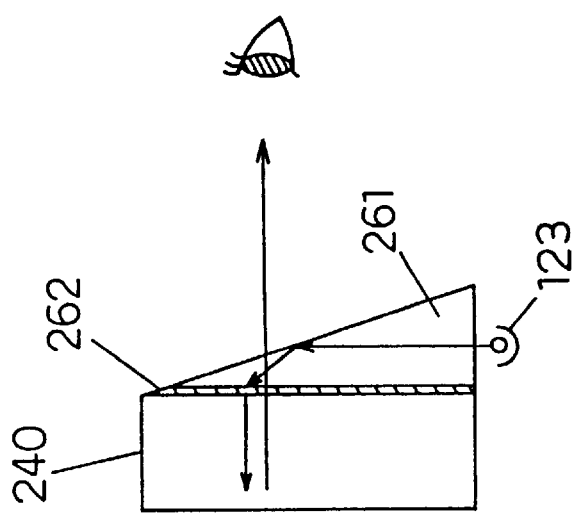
Figure 47A:
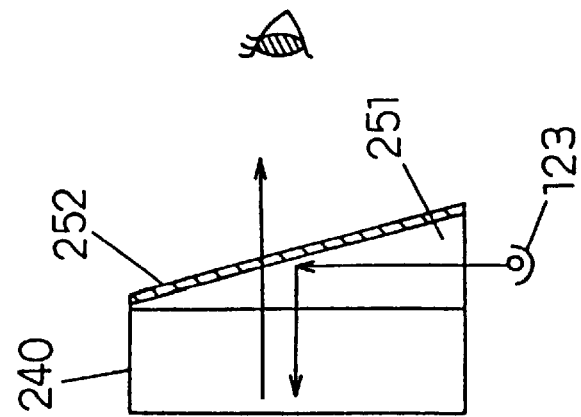

FIG. 47 (a) shows a case where, in the embodiment-E4, a reflection hologram 252 is placed at an angle in advance. In this case, all that is required of a light source 123 is to emit light only upward, and the light source is released from slight angle adjustment. In order to place the hologram at an angle, the cross section of a transparent substrate 251 may be formed into a triangle, or a thin transparent substrate may be obliquely placed. Also, as shown in FIG. 47(b), in a case where light is irradiated from a light source 123 to a transparent substrate 261, the surface is cut so that light is all reflected. Therefore, the reflected light reaches a transparent hologram 262, and is diffracted in the liquid crystal panel direction. In addition, as shown in FIG. 47(c), in an example where a transparent hologram 272 is reversed and placed obliquely, a light source 123 is placed at the vertex of the triangular hologram. The light, irradiated just upward from the light source 123, is diffracted at the hologram 272 and is irradiated in the liquid crystal direction. The cross section of the transparent substrate may be formed into a triangle, or a thin substrate may be placed at an angle. These structures are also useful.

Industrial Applicability

As has been described above, the present invention is a head up display unit which comprises: transparent and flat image information display means; transparent and flat light irradiating means arranged in an opposed and close contact relationship with the image information display means; light supply means for supplying light to the light irradiating means; image-display control means for controlling image display; and light-supply control means for controlling light supply. The display unit may be constructed such that the image information means and the light irradiating means are combined with each other. The display unit can be used in any place in the interior of an automobile and is a substantially transparent and compact head up display unit where optical and illumination systems are integrated with each other.

We claim:

1. A head up display unit comprising:

transparent and flat image information display means having a front surface;

transparent and flat light irradiating means, said light irradiating means between said image information display means and a user;

light supply means for supplying light to a surface of said light irradiating means, said light irradiating means reflecting said light from said front surface of said image information display means;

image-display control means for controlling an image display of said image information display means; and light-supply control means for controlling the light supply of said light supply means.

2. The head up display unit as set forth in claim 1, wherein said transparent and flat image information display means is one selected from a group of a liquid crystal panel, a polymer dispersed liquid crystal panel, and a ferroelectric thin film.

3. The head up display unit as set forth in claim 1, wherein said light irradiating means has optical-path converting means for emitting incident light which was incident from said light supply means arranged on part or all of the peripheral end face of said light irradiating means, in a surface direction of said light irradiating means.

4. The head up display unit as set forth in claim 3, wherein said optical-path converting means is one selected from a group of a volume phase hologram, a phase diffraction grating comprising asymmetrical unevenness, and a half mirror.

5. The head up display unit as set forth in claim 4, wherein said optical-path converting means is a volume phase hologram having a plurality of sections, and at least a first section of the said plurality of sections is different than a second section of said plurality of sections.

6. The head up display unit as set forth in claim 1, wherein said light supply means is a light source itself emitting light, such as various kinds of lamps, a discharge tube, electroluminescence, a plasma illuminant, a light emitting diode, and a laser, or is a phosphor and a light source which excites said phosphor.

7. The head up display unit as set forth in claim 1, wherein said light supply means is provided with a light source and an optical fiber for guiding light from said light source.

8. A head up display unit, wherein the head up display device as set forth in claim 1 is placed on a dashboard of an automobile, has a drive portion which can be pulled down before and after, and is fixed at an arbitrary angle.

9. A head up display unit, wherein the head up display device as set forth in claim 1 is fixed by freely rotatable fixing tool attached to the upper portion of a windshield of an automobile and is pulled down to the windshield surface when it is used.

10. A head up display unit, wherein the head up display device as set forth in claim 1 is placed in the vicinity of a rear window of an automobile and displays image information to the outside.

11. A head up display unit, wherein the head up display device as set forth in claim 1 is part or all of a windshield of an automobile.

12. A head up display unit, wherein the head up display device as set forth in claim 1 is part or all of a rear window of an automobile.

13. The head up display unit as set forth in claim 1, wherein said light from said light supply means is free of traveling through said image information display means.

14. The head up display unit as set forth in claim 1, wherein said light supply means is directly facing said image information display means.

* * * * *

UNITED STATES PATENT AND TRADE MARK OFFICE
CERTIFICATE OF CORRECTION

PATENT NO. : 5,892,598
DATED : April 6, 1999
INVENTOR(S) : Asakawa et al.

It is certified that error appears in the above-identified patent and that said Letters Patent is hereby corrected as shown below:

Cover page, item [30] Foreign Application Priority Data, "Jul. 18, 1994 [JP] 6-163759" should be --Jul. 15, 1994 [JP] 6-163759--.

Cover page, item [56] References Cited, U.S. Patent Documents, "4,942,101 7/1990 Keys et al." should be --4,942,102 7/1990 Keys et al.--

Cover page, item [56] References Cited, Foreign Patent Documents, "3-19803 8/1991 Japan" should be --3-198023 8/1991 Japan--.

Cover page, item [56] References Cited, Other Publications, "Lawrence Domash et al. . . . . Image Stroage and Retrieval Systems . . ." should be --Lawrence Domash et al. . . . Image Storage and Retrieval Systems . . .--

Signed and Sealed this

Nineteenth Day of October, 1999

Attest:

Q. TODD DICKINSON

*Attesting Officer*  *Acting Commissioner of Patents and Trademarks*